(12) United States Patent
Sisbot et al.

(10) Patent No.: US 10,248,196 B2
(45) Date of Patent: Apr. 2, 2019

(54) SYSTEM FOR OCCLUSION ADJUSTMENT FOR IN-VEHICLE AUGMENTED REALITY SYSTEMS

(71) Applicant: TOYOTA JIDOSHA KABUSHIKI KAISHA, Toyota-shi, Aichi-ken (JP)

(72) Inventors: Emrah Akin Sisbot, Mountain View, CA (US); Kentaro Oguchi, Mountain View, CA (US)

( * ) Notice: Subject to any disclaimer, the term of this patent is extended or adjusted under 35 U.S.C. 154(b) by 0 days.

(21) Appl. No.: 15/244,975

(22) Filed: Aug. 23, 2016

(65) Prior Publication Data

US 2018/0059779 A1    Mar. 1, 2018

(51) Int. Cl.
*G06F 3/01* (2006.01)
*B60R 1/00* (2006.01)
(Continued)

(52) U.S. Cl.
CPC .............. *G06F 3/013* (2013.01); *B60R 1/00* (2013.01); *G02B 27/01* (2013.01); *G02B 27/0101* (2013.01); *G06K 9/00805* (2013.01); *G06T 7/20* (2013.01); *G06T 19/006* (2013.01); *G06T 19/20* (2013.01); *B60R 2300/205* (2013.01); *B60R 2300/307* (2013.01); *B60R 2300/308* (2013.01); *B60R 2300/802* (2013.01); *B60R 2300/8033* (2013.01); *G02B 2027/0138* (2013.01); *G02B 2027/0141* (2013.01); *G02B 2027/0187* (2013.01); *G06T 2207/10028* (2013.01); *G06T 2207/30261* (2013.01)

(58) Field of Classification Search
CPC ............ G06F 3/04815; G06K 9/00791; G06T 19/006

USPC .................................. 382/154; 345/629, 633
See application file for complete search history.

(56) References Cited

U.S. PATENT DOCUMENTS 7,133,551 B2 * 11/2006 Chen ...................... G01C 11/04
345/419
8,503,762 B2 * 8/2013 Ben Tzvi .............. G06T 19/006
382/154

(Continued)

FOREIGN PATENT DOCUMENTS

JP       2007-087337       4/2007
JP       PO2015-135591     7/2015

(Continued)

*Primary Examiner* — Jin Cheng Wang
(74) *Attorney, Agent, or Firm* — Burbage Law, P.C.; Jon-Michael Burbage; Elizabeth Ruzich

(57) ABSTRACT

The disclosure includes embodiments for providing occlusion adjustment for an in-vehicle augmented reality system. A system may include a three-dimensional heads-up display unit ("3D HUD") installed in a vehicle. The system may include a memory storing instructions that, when executed, cause the system to: display, on the 3D HUD, a first graphic that is viewable by a driver of the vehicle as overlaying the interested object when the driver is looking at the 3D HUD; determine that at least a portion of the interested object is occluded by an occluding object; turn off the first graphic so that the first graphic is not displayed on the 3D HUD; and display, on the 3D HUD, a second graphic that does not overlay the occluding object and visually indicates to the driver the location of the interested object behind the occluding object when the driver is looking at the 3D HUD.

20 Claims, 12 Drawing Sheets

(51) Int. Cl.
*G02B 27/01* (2006.01)
*G06K 9/00* (2006.01)
*G06T 7/20* (2017.01)
*G06T 19/00* (2011.01)
*G06T 19/20* (2011.01)

(56) References Cited

U.S. PATENT DOCUMENTS

| | | |
|---|---|---|
| 9,767,693 B2 * | 9/2017 | Lee .................. G08G 1/166 |
| 2011/0052042 A1 * | 3/2011 | Ben Tzvi ............ G06T 19/006 |
| | | 382/154 |
| 2015/0078667 A1 * | 3/2015 | Yun .................. G06K 9/6201 |
| | | 382/195 |
| 2016/0063761 A1 | 3/2016 | Sisbot et al. |

FOREIGN PATENT DOCUMENTS

| | | |
|---|---|---|
| JP | 2016-048550 | 4/2016 |
| WO | WO2012/131871 | 10/2012 |

* cited by examiner

SYSTEM FOR OCCLUSION ADJUSTMENT FOR IN-VEHICLE AUGMENTED REALITY SYSTEMS

BACKGROUND

The specification relates to occlusion adjustment for in-vehicle augmented reality systems.

Augmented reality applications are becoming increasingly popular. Some augmented reality applications exist for vehicles. These are known as "in-vehicle augmented reality systems."

Vehicles may be equipped with a heads-up display unit ("HUD"). Some in-vehicle augmented reality systems operate using a HUD.

SUMMARY

One drawback of an in-vehicle augmented reality system including a HUD occurs when there is a physical obstacle between the display graphics and driver's eye. In this situation the graphics cause confusion since the physical obstacle does not occlude the graphics which visually represent an object which in reality is occluded by the physical object.

For example, with reference FIG. 1B, a confusing graphic 121 represents an interested object 117 which in reality is occluded by a physical object (e.g., the occluding object 119). This distortion of reality may confuse the driver of the vehicle. This confusion may cause a safety risk. For example, still referring to FIG. 1B, the confusing graphic 121 may incorrectly cause the driver to think that the interested object 117 is located in front of the occluding object 119 when this is not true.

The confusing graphic 121, which in this example is visually similar to the interested object 117, may also incorrectly cause the driver to believe that the interested object 117 is closer to the vehicle than is actually true in reality. For example, the driver may incorrectly think that the confusing graphic 121 is in fact the interested object 117 because of the visual similarity, and therefore not appreciate the correct distance, or range, separating the vehicle from the interested object 117. This confusion or misunderstanding may also cause the driver to not appreciate the correct distance separating the vehicle from the occluding object 119.

One solution to this problem might be to not display any graphics that represent the interested object 117. However, this solution might also create a safety risk since the driver may not know that the interested object 117 is behind the occluding object 119. An example of this is shown in FIG. 1C. With reference to FIG. 1C, the driver has no way of knowing that the interested object 117 is located behind the occluding object 119. If the driver knew that the interested object 117 (e.g., a human) was behind the occluding object 119, then the driver may make different driving decisions relative to the decisions the driver may make without knowledge that the interested object 117 is located behind the occluding object 119. For example, if the driver knows that the interested object 117 is located behind the occluding object 119 the driver may drive the vehicle slower or stop the vehicle. These driving decisions may reduce the risk to the interested object 117 or the driver by making it less likely that the interested object 117 is struck by the vehicle.

Described herein are embodiments that solve the example problems described above. These embodiments may include providing occlusion adjustment for in-vehicle augmented reality systems. An in-vehicle augmented reality system may include a three-dimensional heads-up display unit ("3D HUD") installed in a vehicle. These embodiments may include adjusting the location of the graphics displayed on the 3D HUD based, for example, on the importance of the interested object and the occlusion.

Examples of these embodiments are depicted in FIGS. 1D-1F. In this way the location of an interested object 117 behind an occluding object 119 may be communicated to the driver without confusing the driver about the distance or range that separates the vehicle and the interested object 117.

In some embodiments, an occlusion application installed in a vehicle including a 3D HUD may provide the functionality described herein. The occlusion application may be executable by a processor of the vehicle. The processor may be an element of an onboard vehicle computer, an engine control unit, a head unit, the 3D HUD or some other processor-based computing device of the vehicle.

In some embodiments, the vehicle may include internal sensors record sensor data describing information about the driver. The internal sensors may track the eye position of the driver relative to a 3D HUD. For example, the internal sensors may record sensor data that describes where the driver's eyes are located and how objects or graphics viewable when looking at the 3D HUD appear to the driver when the driver is looking at the 3D HUD. The occlusion application may receive the sensor data from the internal sensors. The occlusion application may determine the eye position of the driver relative to the 3D HUD based on the sensor data received from the internal sensors.

In some embodiments, the vehicle may include external sensors that record sensor data describing the environment external to the vehicle (sometimes referred to as the "vehicle environment"). The external sensors may track the position of objects in the vehicle environment. Some of these objects may be interested objects or occluding objects. An interested object may include any physical object which may pose a safety risk to the vehicle or be an object which the driver of the vehicle wants to protect from danger or should want to protect from danger. For example, the interested object may be an animal (e.g., a human or a dog), another vehicle or some other physical object that may be located on the roadway. An occluding object may include any physical object which may occlude or obstruct the interested object from being visible by the driver or the external sensors. The external sensors may generate sensor data that describes one or more of the following: the position of one or more interested objects at one or more points in time; timestamps that correspond to the position of the one or more interested objects at the one or more points in time; the position of one or more occluding objects at one or more points in time; and timestamps that correspond to the position of the one or more occluding objects at the one or more points in time. The occlusion application may receive sensor data from the external sensors. The occlusion application may estimate a first position of an interested object in the vehicle environment based on the sensor data received from the external sensors.

In some embodiments, the occlusion application may determine, based on the eye position of the driver when looking at the 3D HUD and the first position of the interested object in the environment, a location for displaying a first graphic on the 3D HUD so that the first graphic overlays the interested object when the first graphic and the interested object are viewed by the driver when looking at the 3D HUD. The occlusion application may display the first graphic on the 3D HUD at the location so that the first graphic is viewable by the driver of the vehicle as overlaying the interested object when the driver is looking at the 3D HUD.

In some embodiments, the occlusion application may determine whether at least a portion of the interested object is occluded by an occluding object based on the sensor data received from the external sensors. Responsive to a determination that the interested object is occluded by the occluding object, the occlusion application may (1) turn off the first graphic so that the first graphic is not displayed on the 3D HUD and (2) display, on the 3D HUD, a second graphic that does not overlay the occluding object and visually indicates to the driver the location of the interested object behind the occluding object when the driver is looking at the 3D HUD.

In some embodiments, the occlusion application may not turn off the first graphic if the interested object is sufficiently important or the location of the interested object is sufficiently important. This may be a function of a preference of the driver.

In some embodiments, the occlusion application may determine the importance of the interested object or the location of the interested object based on the sensor data received from the internal sensors (e.g., "driver information"), the sensor data received from the external sensors describing the vehicle environment and other information such as one or more preferences of the driver.

In some embodiments, the occlusion application may change the way graphics on the 3D HUD are displayed (e.g., transitioning from the first graphic to the second graphic) based on the importance of the interested object or the location of the interested object. In this way, the occlusion application may beneficially provide the driver with additional time and the ability to focus on the vehicle environment so that the driver may react faster and more accurately to objects or conditions in the vehicle environment.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a computer program product including a non-transitory computer-usable medium including a computer-readable program, where the computer-readable program when executed on a computer of a vehicle causes the computer to: determine an eye position of a driver of the vehicle relative to a 3D HUD installed in the vehicle; estimate a first position of an interested object in an environment external to the vehicle and substantially in front of the vehicle; determine, based on the eye position of the driver when looking at the 3D HUD and the first position of the interested object in the environment, a location for displaying a first graphic on the 3D HUD so that the first graphic overlays the interested object when the first graphic and the interested object are viewed by the driver when looking at the 3D HUD; display the first graphic on the 3D HUD at the location so that the first graphic is viewable by the driver of the vehicle as overlaying the interested object when the driver is looking at the 3D HUD; determine whether at least a portion of the interested object is occluded by an occluding object; and responsive to a determination that the interested object is occluded by the occluding object, (1) turn off the first graphic so that the first graphic is not displayed on the 3D HUD and (2) display, on the 3D HUD, a second graphic that does not overlay the occluding object and visually indicates to the driver the location of the interested object behind the occluding object when the driver is looking at the 3D HUD. Other embodiments of this aspect include corresponding computer systems, apparatus, and computer programs recorded on one or more computer storage devices, each configured to perform the actions of the methods.

One general aspect includes a computer-implemented method including: displaying, on a 3D HUD installed in a vehicle, a first graphic that is viewable by a driver of the vehicle when looking at the 3D HUD; determining that at least a portion of an interested object is occluded by an occluding object; turning off the first graphic so that the first graphic is not displayed on the 3D HUD; and displaying, on the 3D HUD, a second graphic that does not overlay the occluding object and visually indicates to the driver that the interested object is located behind the occluding object when the driver is looking at the 3D HUD. Other embodiments of this aspect include corresponding computer systems, apparatus, and computer programs recorded on one or more computer storage devices, each configured to perform the actions of the methods.

Embodiments may include one or more of the following features. The method where the interested object and the occluding object are located outside the vehicle. The method where the interested object and the occluding object are located at least substantially in front of the vehicle. The method where the second graphic also does not overlay the interested object. The method further including tracking motion of the interested object using one or more vehicle sensors. The method where the one or more vehicle sensors includes a camera that tracks the motion of the interested object. The method where the camera tracks the motion of the interested object relative to the occluding object and the vehicle. The method where the one or more vehicle sensors includes a range finder that tracks the motion of the interested object and one or more distances of the interested object relative to the occluding object and the vehicle. The method where the sensors detects the interested object moving from a first position to a second position and the method further includes repositioning a location of the second graphic as displayed on the 3D HUD to correspond to the second position where the second graphic was previously displayed on the 3D HUD to correspond to the first position. Embodiments of the described techniques may include hardware, a method or process, or computer software on a computer-accessible medium.

One general aspect includes a system including: a 3D HUD installed in a vehicle; and a memory storing instructions that, when executed, cause the system to: display, on the 3D HUD, a first graphic that is viewable by a driver of the vehicle as overlaying an interested object when the driver is looking at the 3D HUD; determine that at least a portion of an interested object is occluded by an occluding object; turn off the first graphic so that the first graphic is not displayed on the 3D HUD; and display, on the 3D HUD, a second graphic that does not overlay the occluding object and visually indicates to the driver that the interested object is located behind the occluding object when the driver is looking at the 3D HUD. Other embodiments of this aspect include corresponding computer systems, apparatus, and computer programs recorded on one or more computer storage devices, each configured to perform the actions of the methods.

Embodiments may include one or more of the following features. The system where the interested object and the occluding object are located outside the vehicle. The system where the interested object and the occluding object are located at least substantially in front of the vehicle. The system where the second graphic also does not overlay the interested object. The system where the instructions when executed cause the system to track motion of the interested object using one or more vehicle sensors. The system where the one or more vehicle sensors includes a camera that tracks the motion of the interested object. The system where the camera tracks the motion of the interested object relative to the occluding object and the vehicle. The system where the one or more vehicle sensors includes a range finder that tracks the motion of the interested object and one or more distances of the interested object relative to the occluding object and the vehicle. The system where the sensors detects the interested object moving from a first position to a second position and the instructions when executed cause the system to reposition a location of the second graphic as displayed on the 3D HUD to correspond to the second position where the second graphic was previously displayed on the 3D HUD to correspond to the first position. The system where the instructions when executed cause the system to determine whether the interested object is occluded by the occluding object when located at the second position and, responsive to determining that the interested object is not occluded at the second position, turning off the second graphic so that the second graphic is not displayed on the 3D HUD and displaying the first graphic again on the 3D HUD, where the first graphic is viewable by the driver of the vehicle as overlaying the interested object at the second position when the driver is looking at the 3D HUD. Embodiments of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1A:
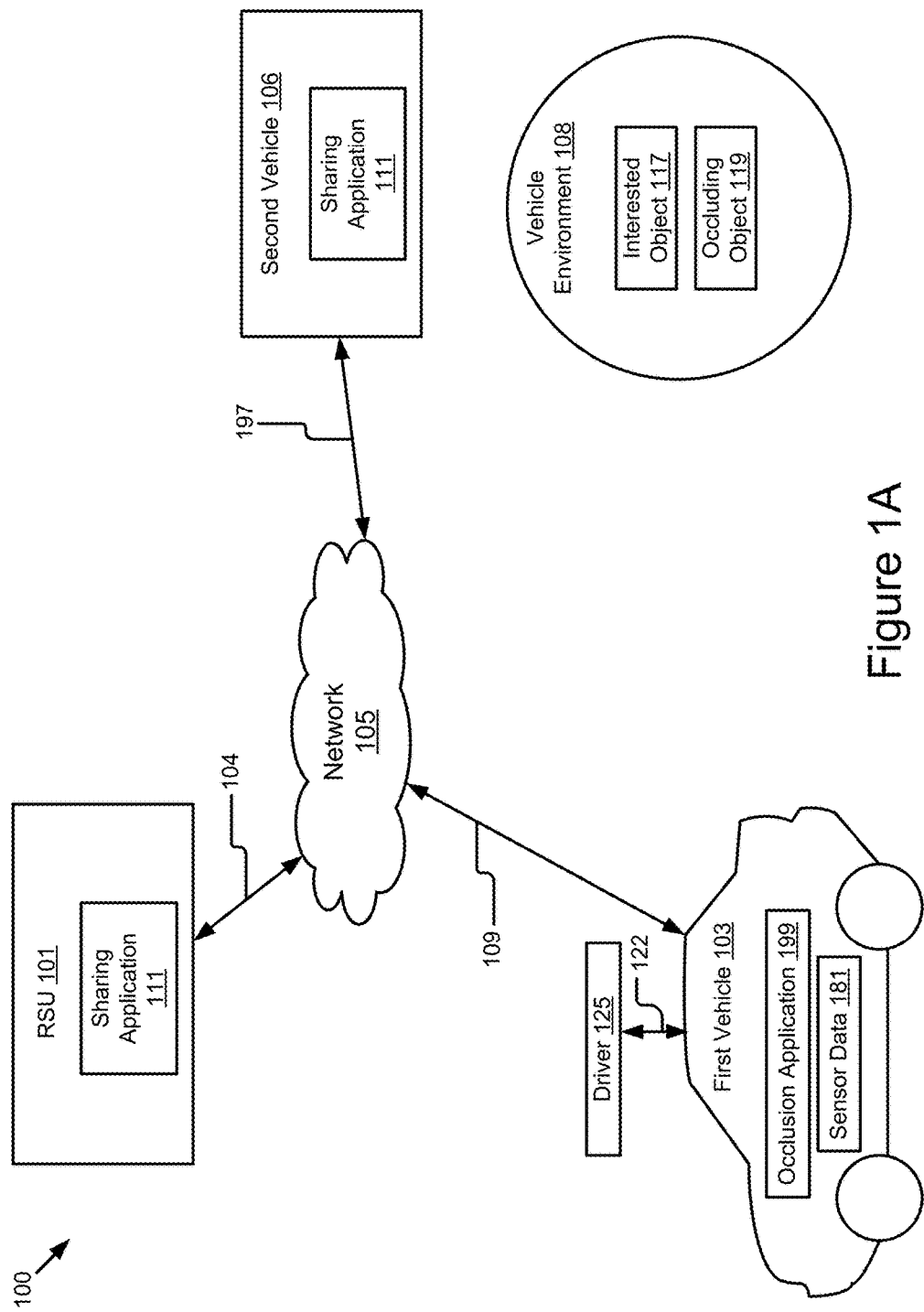
FIG. 1A is a block diagram illustrating an example operating environment for an occlusion application according to some embodiments.

An occlusion application may be an element of a vehicle that includes a 3D HUD. The occlusion application may generate a first graphic that is displayed by the 3D HUD. The first graphic may be displayed on the 3D HUD so that the first graphic at least partially overlays an interested object when viewed by a driver of the vehicle. The first graphic may beneficially enable the driver to distinguish the interested object from other objects in their vision. The occlusion application may include code and routines that, when executed by a processor of the vehicle, causes the processor to (1) activate an internal sensor of the vehicle to identify the eye position of the driver relative to the 3D HUD and (2) cause the 3D HUD to generate the first graphic and display the first graphic at a location on the 3D HUD that, relative to the vision of the driver as indicated by the eye position of the driver, at least partially overlays the interested object as viewed by the driver while looking at the 3D HUD.

In some embodiments, the interested object may be in motion relative to an occluding object. For example, the interested object may be a human and the occluding object may be a parked truck or some other physical object that would occlude the interested object from the vision of the driver of the vehicle. In this example, both the interested object and the occluding object may be present in the environment external to the vehicle ("the vehicle environment"). The occlusion application may include code and routines that, when executed by the processor, causes the processor to (1) monitor the motion of the interested object (or other objects such as the occluding object) using one or more external sensors of the vehicle and (2) update the placement of the first graphic so that it tracks the motion of the interested object and continues to at least partially overlay the interested object as viewed by the driver while looking at the 3D HUD. The updates to the placement of the first graphic may be configured so that the motion of the first graphic seamlessly flows with the motion of the interested object so that to the driver it visually appears that they are coupled to one another.

In some embodiments, the occlusion application may determine that the interested object is at least partially occluded by the occluding object. The occlusion application may include code and routines that, when executed by the processor, turn off the first graphic so that, relative to the vision of the driver, the interested object is occluded by the occluding object.

In some embodiments, the occlusion application may include code and routines that, when executed by the processor, causes the processor to determine that the interested object is at least partially occluded by the occluding object. The occlusion application may include code and routines that, when executed by the processor, causes the processor, responsive to the determination that the interested object is at least partially occluded by the occluding object, to (1) turn off the first graphic so that the first graphic is not displayed by the 3D HUD and (2) cause the 3D HUD to display a second graphic that does not overlay the occluding object and visually indicates to the driver when the driver is looking at the 3D HUD that the location of the interested object is behind the occluding object. In some embodiments, the occlusion application may include code and routines that, when executed by the processor, causes the processor to determine, responsive to the interested object being occluded, a type for the interested object (e.g., human, animal, child, vehicle, etc.) and whether this type of object is sufficiently important to generate the second graphic. If the interested object is determined to be sufficiently important, then steps (1) and (2) described above in this paragraph may be executed responsive to this determination that the interested object is sufficiently important.

In some embodiments, the occlusion application may include code and routines that, when executed by the processor, cause the external sensors of the vehicle to continue to track the motion of the interested object and the occluding object. The occlusion application may include code and routines that, when executed by the processor, causes the processor to determine based on the sensor data received from the external sensors that the interested object is no longer occluded by the occluding object. The occlusion application may include code and routines that, when executed by the processor, causes the processor to turn off the second graphic (if the second graphic was previously turned on) and turn the first graphic back on based on the determination that the interested object is no longer occluded by the occluding object.

System Overview

FIG. 1A is a block diagram illustrating an example operating environment 100 for an occlusion application 199 and a sharing application 198.

The operating environment 100 may include one or more of the following: a roadside unit 101 ("RSU" or "RSU 101" if singular, "RSUs" or "RSUs 101" if plural); a second vehicle 106; and a first vehicle 103. In the illustrated embodiment, these entities of the operating environment 100 may be communicatively coupled via a network 105. The operating environment 100 may include other servers or devices not shown in FIG. 1A including, for example, a traffic server for providing traffic data, a weather server for providing weather data, a power service server for providing power usage service (e.g., billing service), and a map server for providing map data, etc.

The first vehicle 103 may be accessed by a driver 125 via a signal line 122. For example, the signal line 122 may represent one or more of a steering wheel and some other vehicle input device (e.g., a transmission, a gas pedal, a brake pedal, a head unit, a button, a switch, a sensor, etc.) which the driver 125 uses to control the first vehicle 103 or provide an input to the first vehicle 103.

In some embodiments, the first vehicle 103 may be located in a vehicle environment 108. The vehicle environment 108 may include a portion of the physical world where the first vehicle 103 is located. The vehicle environment 108 may include one or more of the following: the RSU 101; the second vehicle 106; an interested object 117; and an occluding object 119. The interested object 117 may be a physical object which is or should be of interest to the driver 125. The occluding object 119 may be a physical object which may occlude the interested object 117, in whole or in part, from the vision of the driver 125. In some embodiments, the vehicle environment 108 may include a roadway environment.

The interested object 117 may include, for example, one or more of the following: a human; an animal (e.g., dog, cat, deer, cow, possum, etc.); a vehicle; a bicycle; roadway debris or some other object present on a roadway; a pothole; an ice patch; a puddle or some other aggregation of liquid such as water; a traffic signal; a sign or some other communication device; and any physical object which may be present in the vehicle environment 108.

The occluding object 119 may include, for example, one or more of the following: a vehicle (e.g., a parked truck, a parked car, a traveling truck; a traveling car); a sign or some other communication device; a vending machine; a pole (e.g., a sign pole, a power pole; pole for a traffic light, etc.); a building; roadway debris or some other object present on a roadway; and any physical object which may be present in the vehicle environment 108.

The first vehicle 103, the second vehicle 106, the RSU 101 and the vehicle environment 108 in FIG. 1A can be used by way of example. While FIG. 1A illustrates one first vehicle 103, one second vehicle 106, one RSU 101 and one vehicle environment 108, the disclosure applies to a system architecture having one or more first vehicles 103, one or more second vehicles 106, one or more RSUs 101 and one or more vehicle environments 108. Furthermore, although FIG. 1A illustrates one network 105 coupled to the first vehicle 103, the second vehicle 106 and the RSU 101, bit in practice one or more networks 105 can be connected to these entities.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth communication networks or a cellular communications network for sending and receiving data including via short messaging service (SMS), multimedia messaging service (MMS), hypertext transfer protocol (HTTP), direct data connection, wireless application protocol (WAP), e-mail, DSRC, etc. The network 105 may also include a mobile data network that may include third-generation (3G), fourth-generation (4G), long-term evolution (LTE), Voice-over-LTE ("VoLTE") or any other mobile data network or combination of mobile data networks. Further, the network 105 may include one or more IEEE 802.11 wireless networks.

In some embodiments, the network 105 may include one or more communication channels shared among the first vehicle 103 and one or more other wireless communication devices. The communication channel may include DSRC or any other wireless communication protocol. For example, the network 105 may be used to transmit a DSRC message, DSRC probe or basic safety message to a first vehicle 103. In some embodiments, the network 105 includes communication channels for sending and receiving data via full-duplex wireless communication as described in U.S. patent application Ser. No. 14/471,387 filed on Aug. 28, 2014 and entitled "Full-Duplex Coordination System," the entirety of which is hereby incorporated by reference.

The RSU 101 may be communicatively coupled to the network 105 via a signal line 104. The second vehicle 106 may be communicatively coupled to the network 105 via a signal line 197. The first vehicle 103 may be communicatively coupled to the network 105 via a signal line 109.

In some embodiments, the operating environment 100 may include a GPS satellite for providing GPS location data to the first vehicle 103 or the second vehicle 106 that describes the geographic location of the first vehicle 103 or the second vehicle 106, respectively.

The first vehicle 103 may include a car, a truck, a sports utility vehicle, a bus, a semi-truck, a drone or any other roadway-based conveyance that includes a 3D HUD. In some embodiments, the first vehicle 103 may include an autonomous vehicle or a semi-autonomous vehicle.

In some embodiments, the first vehicle 103 may include one or more of the following elements: a 3D HUD; a processor; a non-transitory memory; a communication unit; a sensor set; and an occlusion application 199. The processor may be an element of an onboard vehicle computer, an electronic control unit, a head unit, the 3D HUD or some other processor-based computing device.

The 3D HUD may be described in U.S. patent application Ser. No. 15/080,433 filed on Mar. 24, 2016 and entitled "Wireless Data Sharing Between a Mobile Client Device and a Three-Dimensional Heads-Up Display Unit," the entirety of which is herein incorporated by reference. An example embodiment of the 3D HUD is described in more detail below with reference to FIG. 2B.

The processor, the non-transitory memory, communication unit and sensor set may include similar functionality as the processor 225, the memory 227, the communication unit 245 and the sensor set 212, respectively, which are described below with reference to FIG. 2A.

In some embodiments, the sensor set may include one or more sensors. The one or more sensors may be operable to measure the vehicle environment 108. For example, the sensor set record one or more physical characteristics of the vehicle environment 108. The one or more physical characteristics may be recorded directly (e.g., atmospheric pressure, temperature, or any other parameters capable of direct measurement by a vehicle sensor) or indirectly (e.g., an image or sound recording that depicts or describes a physical characteristic of the vehicle environment 108 or an object or event present within the vehicle environment).

In some embodiments, the sensor set may include one or more sensors that are operable to measuring the performance of the first vehicle 103. For example, the sensor set may record sensor data 181 that describes a speed or acceleration of the first vehicle 103.

In some embodiments, the sensor set may include one or more of the following vehicle sensors: an external microphone; an internal microphone; an external camera; an internal camera; a LIDAR sensor; a laser-based range finder; a laser altimeter; a navigation sensor (e.g., a global positioning system sensor of the DSRC-compliant GPS unit that is accurate to within 1.5 meters, as opposed to being accurate to within 10 meters as is the case for non-DSRC-compliant GPS units); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set may be operable to record sensor data 181 that describes one or more locations of the first vehicle 103 at one or more different times, images or other measurements of the vehicle environment 108 and objects or other vehicles present in the vehicle environment 108, etc. In this way, the sensor data 181 may describe the vehicle environment 108.

In some embodiments, the sensor data 181 may describe one or more of the following: a location of the first vehicle 103 at one or more different times (e.g., as indicated by time stamps associated with the sensor data 181 that describes the location of the first vehicle 103); a location of the interested object 117 at one or more different times (e.g., as indicated by time stamps associated with the sensor data 181 that describes the location of the interested object 117); a location of the occluding object 119 at one or more different times (e.g., as indicated by time stamps associated with the sensor data 181 that describes the location of the occluding object 119); a distance or range separating the first vehicle 103 from the interested object 117; a distance or range separating the first vehicle 103 from the occluding object 119; a distance or range separating the interested object 117 from the occluding object 119; one or more colors of the interested object 117; one or more colors of the occluding object 119; one or more images of the interested object 117, the occluding object 119 or any other features or elements of the vehicle environment 108.

The occlusion application 199 may include code and routines that are stored on the non-transitory memory of the first vehicle 103 and accessible and executable by the processor of the first vehicle 103.

In some embodiments, the occlusion application 199 may control the operation of the 3D HUD. For example, the occlusion application 199 may include code and routines that, when executed by the processor of the first vehicle 103, cause the 3D HUD to generate graphics that highlight the presence of objects such as the interested object 117 in the vehicle environment 108. For example, one or more sensors of the sensor set may detect and track the presence of the interested object 117 and the occlusion application 199 may cause the 3D GUI to display a first graphic that highlights the presence of the interested object 117 as viewed by the driver 125 when looking at the 3D HUD by overlaying the graphic over at least a portion of the interested object 117. The first graphic may be configured by the occlusion application 199 to make the interested object 117 more noticeable for the driver 125 when the driver 125 looks at the interested object 117 through the 3D HUD. The occlusion application 199 may cause the sensor set to continue to monitor and track the location of the interested object in the vehicle environment 108 over time. As the interested object 117 moves over time, the occlusion application 199 may cause the 3D HUD to relocate the first graphic so that the position of the first graphic tracks the position of the interested object 117 as viewed by the driver 125.

In some embodiments, the occlusion application 199 may automatically create an occlusion if the position of the interested object 117 changes so that the interested object is located behind a physical obstacle such as the occluding object 119. For example, the occlusion application 199 may cause the 3D HUD to cease to display the first graphic that highlights the presence of the interested object 117 responsive to one or more sensors of the sensor set providing sensor data 181 indicating that the interested object 117 is located behind the occluding object 119. If the interested object 117 is sufficiently important, the occlusion application 199 may relocate the graphic for the interested object 117. For example, the occlusion application 199 may turn off the first graphic since otherwise the first graphic may overlay the occluding object 119, which may confuse the driver 125. See, for example, the confusing graphic 121 depicted in FIG. 1B. Referring back to FIG. 1A, the occlusion application 199 may cause the 3D HUD to display a second graphic that does not overlay the occluding object 119 and indicates the location of the interested object 117 behind the occluding object 119. See, for example, the second graphic 124 depicted in FIG. 1E.

Referring back to FIG. 1A, in some embodiments the occlusion application 199 may generate a first graphic that is displayed by the 3D HUD. The first graphic may be displayed on the 3D HUD so that the first graphic at least partially overlays the interested object 117 when viewed by the driver 125. The first graphic may beneficially enable the driver to distinguish the interested object 117 from other objects in their vision when they look at the 3D HUD. The occlusion application 199 may include code and routines that, when executed by a processor of the first vehicle 103, causes the processor to perform one or more of the following steps: (1) activate an internal sensor of the sensor set to identify the eye position of the driver 125 relative to the 3D HUD (e.g., the internal sensor may identify an angle of vision between the eye of the driver and the portion of the 3D HUD where the interested object 117 is viewable by the driver 125); and (2) cause the 3D HUD to generate the first graphic and display the first graphic at a location on the 3D HUD that, relative to the vision of the driver 125 as indicated by the eye position of the driver 125, at least partially overlays the interested object as viewed by the driver 125 while looking at the 3D HUD.

In some embodiments, the internal sensor may provide sensor data 181 that describes a three dimensional Cartesian coordinate separating one or more eyes of the driver 125 and the portion of the 3D HUD where the interested object 117 is viewable by the driver 125. For example, the top left-hand corner of the 3D HUD may be an origin location (0,0,0) on a grid (any other point of the 3D HUD may serve as the origin). The Z-axis may describe a distance from one or more eyes of the driver 125 and the portion of a horizontal cross-section of the 3D HUD where the interested object 117 is viewable by the driver 125. The X-axis and the Y-axis may describe the vertical and horizontal positions of the point in the 3D HUD where the interested object 117 is viewable by the driver 125 relative to the origin. For example, if: (1) one millimeter in real space equal one unit in the Cartesian coordinate system; (2) the point in the 3D HUD where the interested object 117 is viewable by the driver 125 relative to the origin is 25 millimeters below the origin and 100 millimeters to the right of the origin; and (3) the one or more eyes of the driver 125 are 200 millimeters from the horizontal cross-section of the 3D HUD where the interested object is viewable by the driver 125; then the sensor data 181 may provide data from which the occlusion application 199 may determine a Cartesian coordinate separating the one or more eyes of the driver 125 and the portion of the 3D HUD where the interested object 117 is viewable by the driver 125 as being (100,−25,200).

In some embodiments, the interested object 117 may be in motion relative to an occluding object 119. For example, the interested object 117 may be a human and the occluding object 119 may be a parked truck or some other physical object that would occlude the interested object 117 from the vision of the driver 125 when looking through the 3D HUD. The occlusion application 199 may include code and routines that, when executed by the processor, causes the processor to (1) monitor the motion of the interested object 117 (or other objects such as the occluding object 119) using one or more external sensors of the sensor set and (2) update the placement of the first graphic so that it tracks the motion of the interested object 117 and continues to at least partially overlay the interested object 118 as viewed by the driver 125 while looking at the 3D HUD. The updates to the placement of the first graphic may be configured so that the motion of the first graphic seamlessly flows with the motion of the interested object 117 in the vehicle environment 108 so that to the driver 125 the first graphic visually appears as though it is coupled to the interested object 117 (or a component of the interested object 117).

In some embodiments, the sensors of the sensor set may continue to track the position of the interested object 117 over time and provide sensor data 181 that describes the location of the interested object 117 over time. The occlusion application 199 may determine based on sensor data 181 that the interested object 117 is at least partially occluded by the occluding object 119. The occlusion application 199 may include code and routines that, when executed by the processor, turn off the first graphic so that it is no longer displayed by the 3D GUI and, relative to the vision of the driver 125, the interested object 117 is occluded by the occluding object 119.

In some embodiments, the occlusion application 199 may include code and routines that, when executed by the processor of the first vehicle 103, causes the processor to determine that the interested object 117 is at least partially occluded by the occluding object 119. The occlusion application 199 may include code and routines that, when executed by the processor, causes the processor, responsive to the determination that the interested object 117 is at least partially occluded by the occluding object 119, to (1) turn off the first graphic so that the first graphic is not displayed by the 3D HUD and (2) cause the 3D HUD to display a second graphic that does not overlay the occluding object 119 and visually indicates to the driver when the driver is looking at the 3D HUD that the location of the interested object 117 is behind the occluding object 119. See, for example, FIGS. 1D, 1E and 1F. In some embodiments, the occlusion application 199 may include code and routines that, when executed by the processor, causes the processor to determine, responsive to the interested object 117 being occluded, a type for the interested object (e.g., human, animal, child, vehicle, etc.) and whether this type of object is sufficiently important to generate the second graphic. If the interested object 117 is determined to be sufficiently important, then steps (1) and (2) described above in this paragraph may be executed responsive to this determination that the interested object 117 is sufficiently important.

In some embodiments, the occlusion application 199 may include code and routines that, when executed by the processor of the first vehicle 103, cause the external sensors of the first vehicle 103 to continue to track the motion of the interested object 117 and the occluding object 119 in the vehicle environment 108. The occlusion application 199 may include code and routines that, when executed by the processor, causes the processor to determine, based on the sensor data received from the external sensors, that the interested object 117 is no longer occluded by the occluding object 119. The occlusion application 199 may include code and routines that, when executed by the processor, causes the processor to turn off the second graphic (if the second graphic was previously turned on) and turn the first graphic back on based on the determination that the interested object is no longer occluded by the occluding object 119. See, for example, FIG. 1F.

Figure 1B:
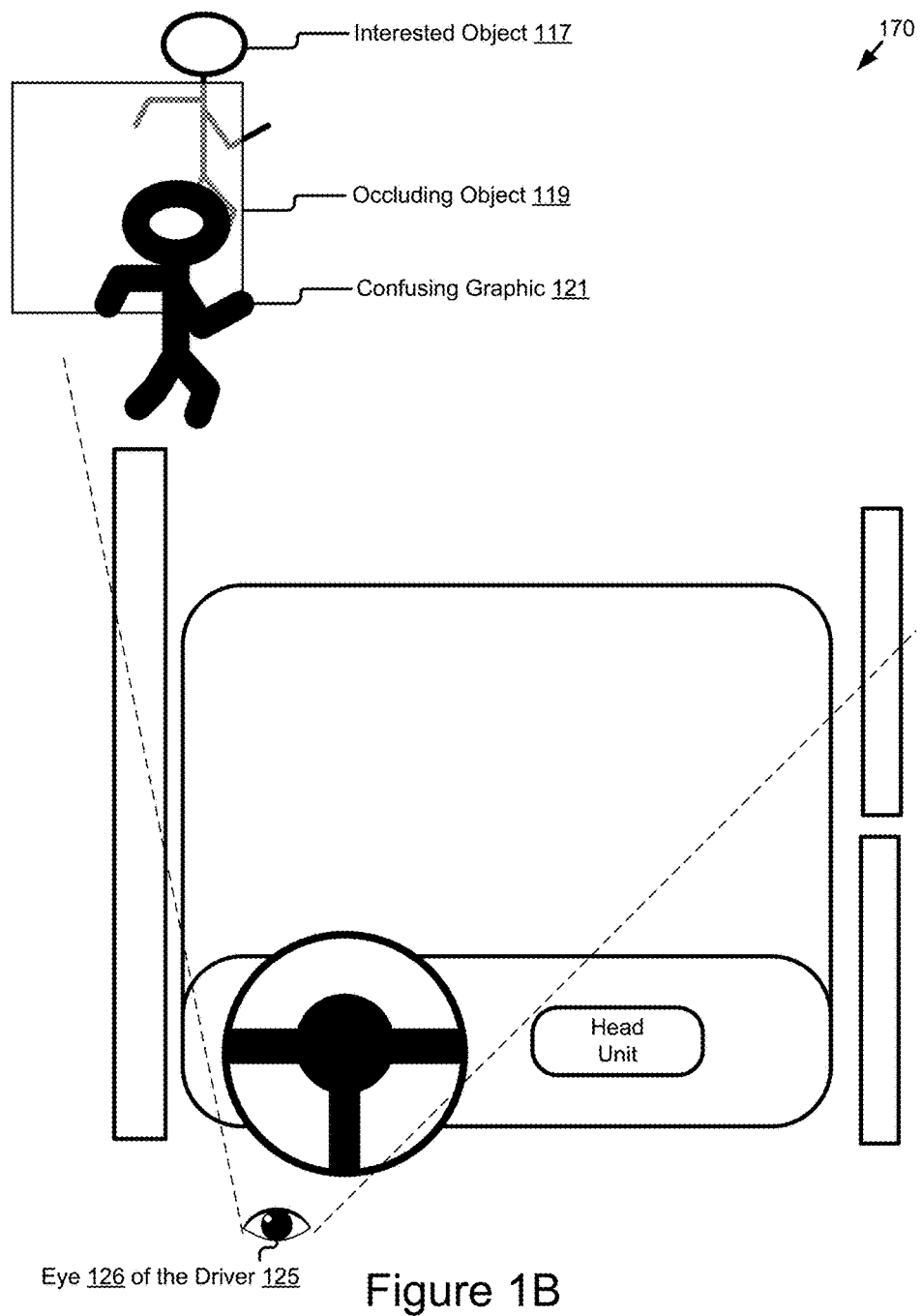
FIG. 1B is a graphic representation, according to some embodiments, of a 3D HUD in which a graphic representing an interested object is displayed by the 3D HUD even though the interested object is occluded by an occluding object.
Figure 1C:
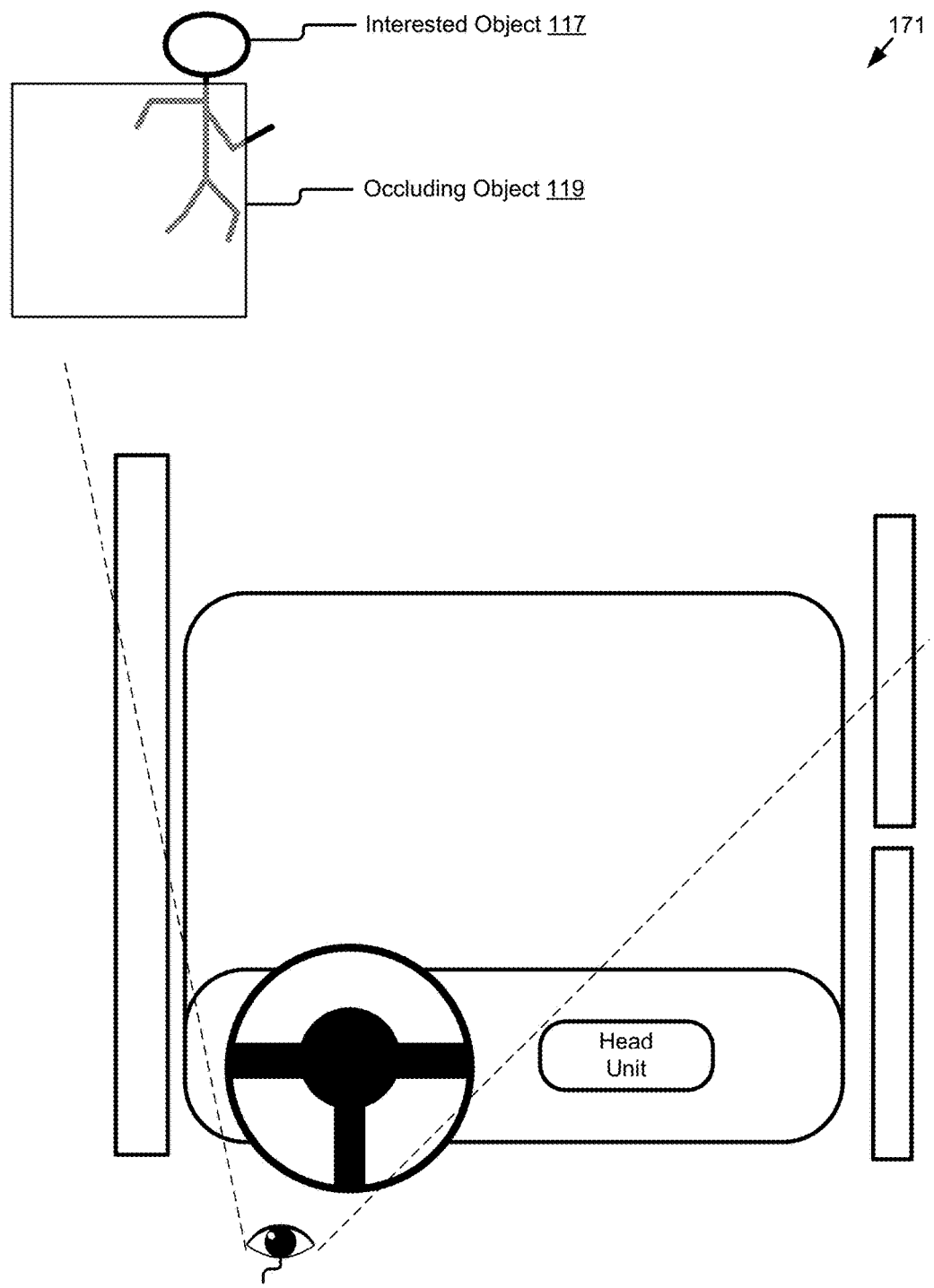
FIG. 1C is a graphic representation, according to some embodiments, of a 3D HUD in which a graphic representing an interested object is not displayed by the 3D HUD when the interested object is occluded by an occluding object.
Figure 1D:
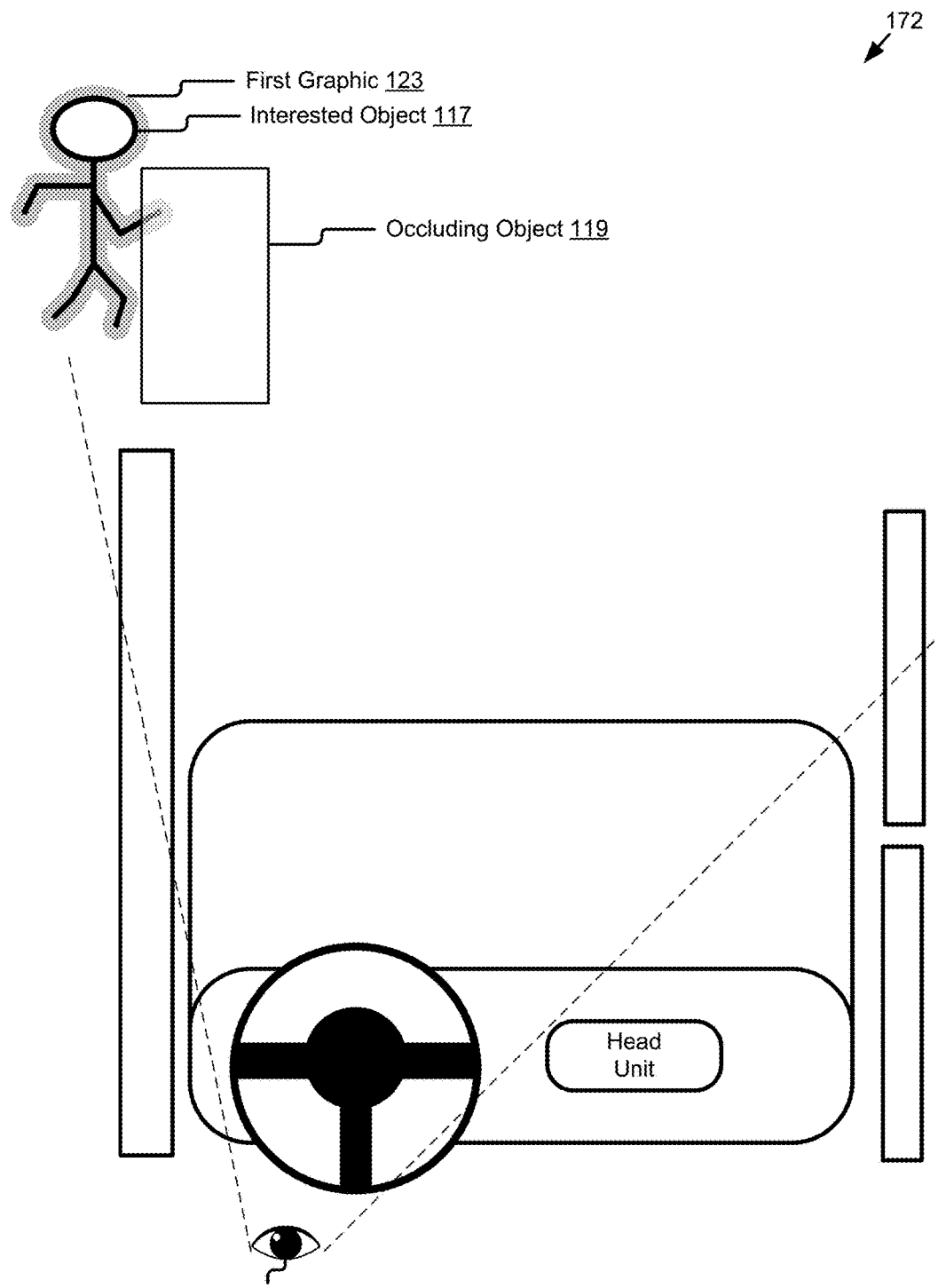
FIGS. 1D-1F are a series of graphic representations, according to some embodiments, of a 3D HUD in which an interested object is in motion relative to an occluding object and a graphic is displayed by the 3D HUD based on one or more of whether the interested object is occluded by the occluding object and whether the interested object is sufficiently important.
Figure 1E:
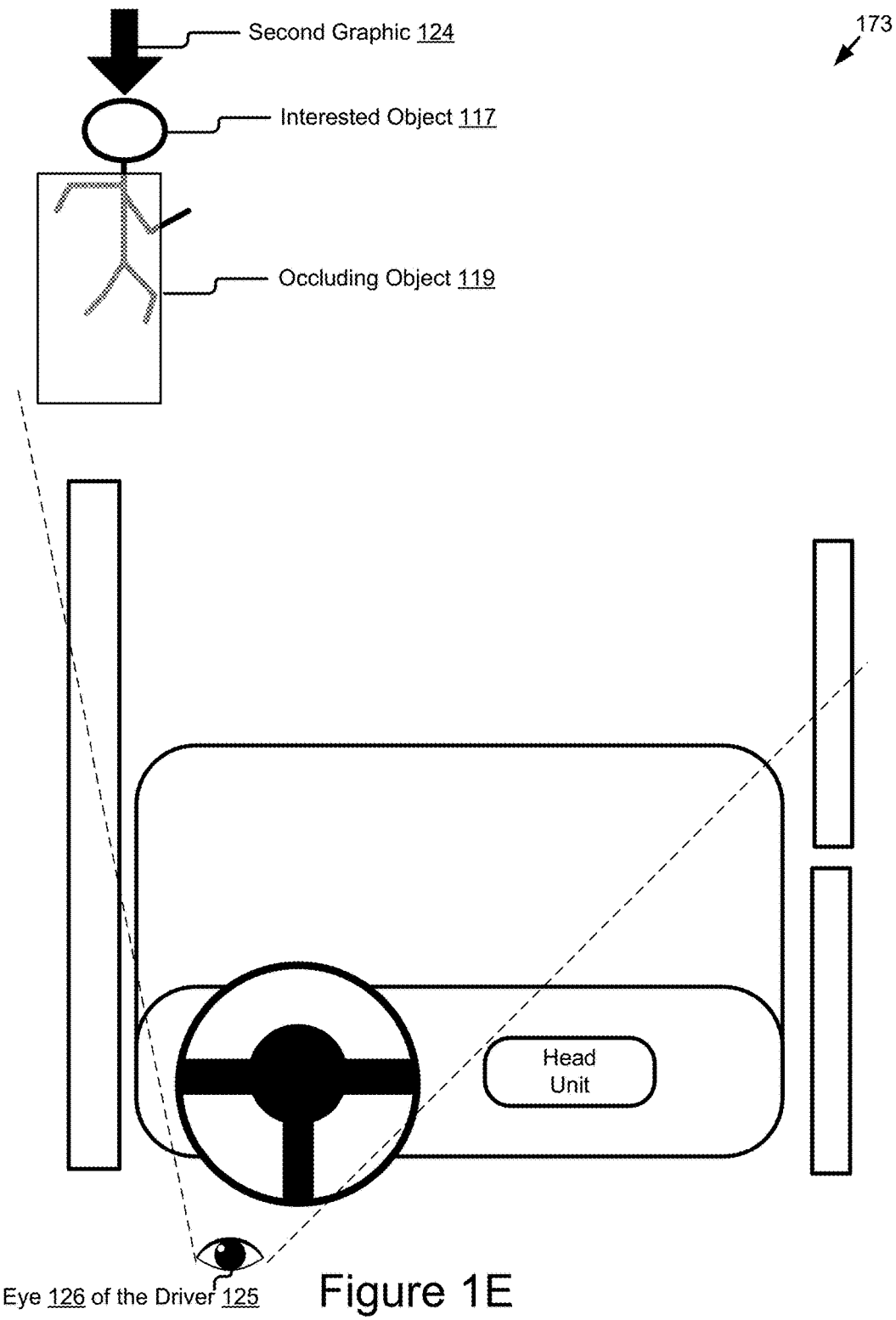
Figure 1F:
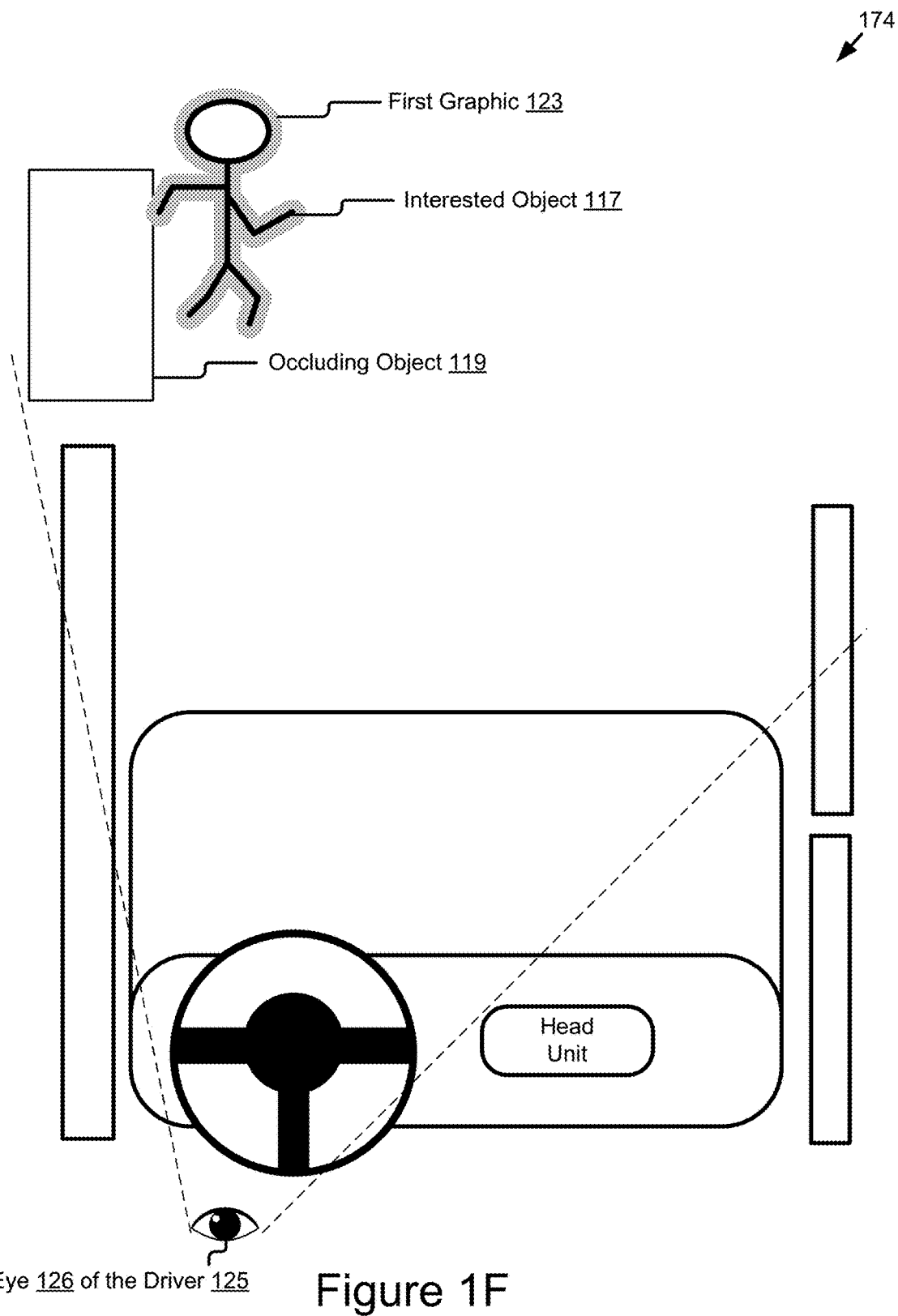

In some embodiments, the occlusion application 199 may include code and routines that, when executed by a processor of the first vehicle 103, causes the 3D HUD of the first vehicle 103 to display one or more of the GUIs depicted in FIGS. 1D, 1E and 1F.

In some embodiments, the occlusion application 199 may include code and routines that, when executed by a processor of the first vehicle 103, causes the processor to execute one or more of the steps described below with reference to method 300 depicted in FIGS. 3A-3C.

In some embodiments, the occlusion application 199 can be implemented using hardware including a field-programmable gate array ("FPGA") or an application-specific integrated circuit ("ASIC"). In some other embodiments, the occlusion application 199 can be implemented using a combination of hardware and software. The occlusion application 199 may be stored in a combination of the devices and servers, or in one of the devices or servers.

The sensor data 181 may include any data necessary for the occlusion application 199 to provide its functionality.

The occlusion application 199 is described in more detail below with reference to FIG. 2A.

The second vehicle 106 includes similar functionality as the first vehicle 103, and so, that description will not be repeated here. In some embodiments, the second vehicle 106 may include one or more of the following elements: a 3D HUD; a processor; a non-transitory memory; a communication unit; and a sensor set. These elements of the second vehicle 106 are similar to those described above for the first vehicle 103, and so, those descriptions will not be repeated here.

The second vehicle 106 also includes a sharing application 111. The sensor set of the second vehicle 106 may collect sensor data 181 which is stored on the non-transitory memory of the second vehicle 106. The sharing application 111 may generate a wireless message that includes the sensor data 181 or a portion of the sensor data 181. The sharing application 111 may cause the communication unit of the second vehicle 106 to transmit the wireless message to the network 105. The communication unit of the first vehicle 103 may receive the wireless message from the network 105. In this way, the sharing application 111 beneficially enables the occlusion application 199 of the first vehicle 103 to provide its functionality using sensor data 181 which is sourced, in whole or in part, from a remote source such as the second vehicle 106.

In some embodiments, the sharing application 111 may include code and routines that, when executed by a processor of the second vehicle 106, causes the processor to execute one or more of the steps described below with reference to method 300 depicted in FIGS. 3A-3C.

In some embodiments, the sharing application 111 can be implemented using hardware including an FPGA or an ASIC. In some other embodiments, the sharing application 111 can be implemented using a combination of hardware and software. The sharing application 111 may be stored in a combination of the devices and servers, or in one of the devices or servers.

The sharing application 111 is described in more detail below with reference to FIG. 2C.

As described above, the RSU 101 is a roadside service unit. In some embodiments, the RSU 101 may include one or more of the following elements: a processor; a non-transitory memory; a communication unit; and a sensor set. These elements of the RSU 101 are similar to those described above for the first vehicle 103, and so, those descriptions will not be repeated here.

The RSU 101 may also include a sharing application 111. For example, the sensor set of the RSU 101 may collect sensor data 181 and the sharing application 111 may cause a processor of the RSU 101 to share the sensor data 181 with the occlusion application 199 of the first vehicle 103.

Referring now to FIG. 1B, depicted is a graphic representation 170, according to some embodiments, of a 3D HUD in which a confusing graphic 121 representing an interested object 117 is displayed by the 3D HUD even though the interested object 117 is occluded by an occluding object 119. The confusing graphic 121 may confuse the driver 125 of the vehicle. For example, the driver 125 may think that the interested object 117 is in front of the occluding object 119 because the confusing graphic 121 is visually similar to the interested object and overlays a portion of the occluding object 119 so that it appears to be in front of the occluding object as viewed by one or more eyes 126 of the driver 125. The confusing graphic 121 may also cause the driver 125 to think that the interested object 117 is closer to the vehicle, in terms of range or distance, than is actually the case in reality because the confusing graphic 121 may make it appear as though the interested object 117 is in front of the occluding object 119, and therefore apparently closer to the vehicle, when it is in fact behind the occluding object 119, and therefore actually further away from the vehicle. The occlusion application 199 beneficially solves these example problems. For example, the occlusion application 199 may generate a first graphic and a second graphic as described herein.

Referring now to FIG. 1C, depicted is a graphic representation 171, according to some embodiments, of a 3D HUD in which a graphic representing an interested object 117 is not displayed by the 3D HUD when the interested object is occluded by an occluding object 119. This may result in a safety risk for the interested object or the driver 125 of the vehicle. For example, as viewed by one or more eyes 126 of the driver 125, the driver 125 may not see the interested object 117 which is occluded by the occluding object 119. If the driver 125 did see the interested object 117, the driver 125 may take a remedial action designed to reduce risk to the interested object 117 or the driver 125. Examples of remedial actions may include one or more of the following: slowing down the speed of the vehicle; braking the vehicle; changing lanes of travel so that the vehicle is traveling in a different lane or a different road; stopping the vehicle; and any other action which the driver 125 may believe may reduce the risk. However, the driver 125 may not take any of these remedial actions because they cannot see the interested object 117. The occlusion application beneficially solves this example problem. For example, the occlusion application 199 may selectively generate a first graphic and a second graphic as described herein. The occlusion application 199 may select whether to display one or more of the graphics based on the importance of the interested object 117 relative to a threshold.

Referring now to FIGS. 1D-1F, depicted are a series of graphic representations 172, 173, 174, according to some embodiments, of a 3D HUD in which an interested object 117 is in motion relative to an occluding object 119 and a first graphic 123 or a second graphic 124 is selectively displayed by the 3D HUD based on one or more of: (1) whether the interested object 117 is occluded by the occluding object 119; and (2) whether the interested object 117 is sufficiently important.

Referring now to FIG. 1D, in some embodiments the sensor data may indicate that the interested object 117 is not occluded by the occluding object 119. The occlusion application may analyze the sensor data to determine that the interested object 117 is not occluded by the occluding object 119 relative to the vision of one or more eyes 126 of the driver 125. The occlusion application may generate GUI data for causing the 3D HUD to display the first graphic 123. The occlusion application may provide the GUI data to the 3D HUD. The occlusion application may cause the 3D HUD to display the first graphic 123 at a location on the 3D HUD that, relative to the vision of the driver 125, appears to overlay the interested object 117 but not the occluding object 119. For example, the occlusion application may: (1) determine, based on sensor data collected by one or more internal sensors of the vehicle, a Cartesian coordinate for where the first graphic 123 should be located on the 3D HUD relative to the one or more eyes 126 of the driver 125 so that the first graphic 123 appears to overlay the interested object 117 but not the occluding object 119. For example, the occlusion application may; and (2) cause the 3D HUD to display the first graphic 123 at the location corresponding to the Cartesian coordinate determined by the occlusion application.

Referring now to FIG. 1E, in some embodiments the sensor data may indicate that the interested object 117 is occluded by the occluding object 119. The occlusion application may analyze the sensor data to determine that the interested object 117 is occluded by the occluding object 119 relative to the vision of one or more eyes 126 of the driver 125.

In some embodiments, the occlusion application may cause the 3D HUD to stop displaying the first graphic 123.

In some embodiments, the occlusion application may generate GUI data for causing the 3D HUD to display the second graphic 124. The occlusion application may provide the GUI data to the 3D HUD. The occlusion application may cause the 3D HUD to display the second graphic 124 at a location on the 3D HUD that, relative to the vision of the driver 125, does not overlay interested object 117 or the occluding object 119 but still indicates that the interested object 117 is located behind the occluding object 119. For example, the occlusion application may: (1) determine, based on sensor data collected by one or more internal sensors of the vehicle, a Cartesian coordinate for where the second graphic 124 should be located on the 3D HUD relative to the one or more eyes 126 of the driver 125 so that the second graphic 124 does not overlay the interested object 117 or the occluding object 119 but still indicates that the interested object 117 is located behind the occluding object 119; and (2) cause the 3D HUD to display the second graphic 124 at the location corresponding to the Cartesian coordinate determined by the occlusion application.

In this way the occlusion application may selectively cause the 3D HUD to display either the first graphic 123 or the second graphic 124.

In some embodiments, the occlusion application may determine a type for the interested object 117 (for example, based on sensor data such as images describing the interested object 117 and a set of object priors describing known objects having a known type such as "human," "vehicle," "dog," "cat," etc.). Different types of interested objects 117 may be associated with different levels of importance. This importance may be quantified with a value. For example, any interested object 117 determined to be of "human" type, may be associated with a relatively high importance relative to other types of interested objects. For example, a memory of the vehicle may store a table having a first column of types and a second column of importance values associated with the different types in the first column. The memory may also store an importance threshold. In some embodiments, the occlusion application may (1) determine the type for the interested object 117, (2) determine the importance value associated with the type determined for the interested object and (3) retrieve the importance threshold for comparison to the importance value associated with the type determined for the interested object 117. In some embodiments, the occlusion application may determine whether the importance value for the type determined for the interested object 117 meets or exceeds the importance threshold. In some embodiments, the occlusion application may only cause the 3D HUD to display the second graphic 124 if the importance value for the type determined for the interested object 117 meets or exceeds the importance threshold.

In this way, the occlusion application may selectively display the second graphic 124 based on the importance of the interested object 117.

Referring now to FIG. 1F, in some embodiments the sensor data may indicate that the interested object 117 is no longer occluded by the occluding object 119 when in previously was occluded by the occluding object 119 (see, for example, FIG. 1E which may have occurred at a point in time prior to FIG. 1F). The occlusion application may analyze the sensor data to determine that the interested object 117 is no longer occluded by the occluding object 119 relative to the vision of one or more eyes 126 of the driver 125.

In some embodiments, the occlusion application may cause the 3D HUD to stop displaying the second graphic 124.

In some embodiments, the occlusion application may generate GUI data for causing the 3D HUD to display the first graphic 123 again. The occlusion application may provide the GUI data to the 3D HUD. The occlusion application may cause the 3D HUD to display the first graphic 123 at a location on the 3D HUD that, relative to the vision of the driver 125, overlays the interested object 117 but not the occluding object 119 similar to what was described above for FIG. 1D.

Example Systems

Figure 2A:
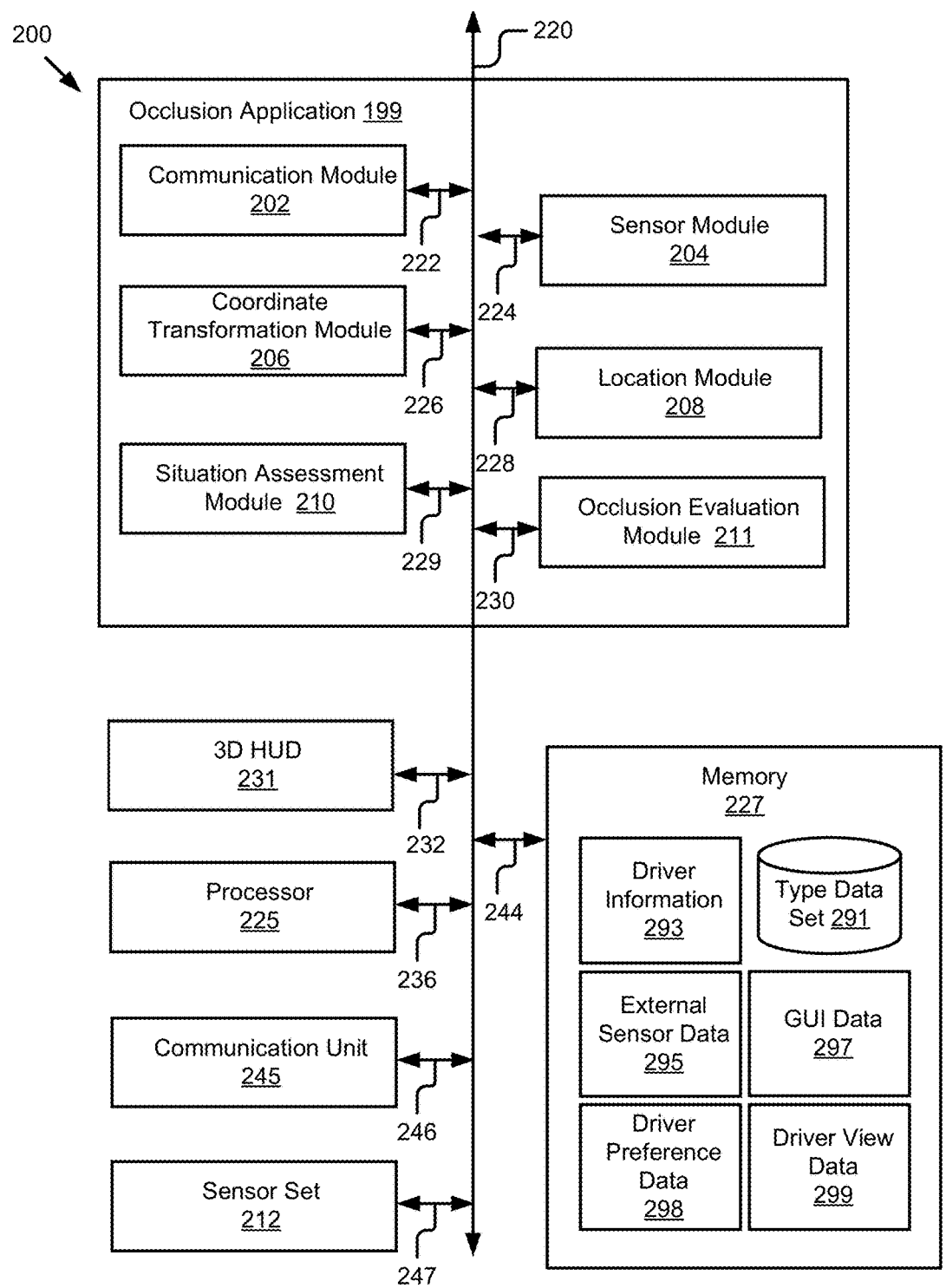
FIG. 2A is a block diagram illustrating an example computer system including an occlusion application according to some embodiments.

Referring now to FIG. 2A, an example of a computer system 200 including the occlusion application 199 is depicted.

FIG. 2A is a block diagram of a computer system 200 that includes the occlusion application 199, a processor 225, a memory 227, a 3D HUD 231, a sensor set 212 and a communication unit 245, according to some examples. The components of the computer system 200 are communicatively coupled by a bus 220. In some embodiments, the computer system 200 can be the first vehicle 103.

The processor 225 includes an arithmetic logic unit, a microprocessor, a general-purpose controller, or some other processor array to perform computations and provide electronic display signals to a display device. The processor 225 is coupled to the bus 220 for communication with the other components via a signal line 236. The processor 225 processes data signals and may include various computing architectures including a complex instruction set computer (CISC) architecture, a reduced instruction set computer (RISC) architecture, or an architecture implementing a combination of instruction sets. Although FIG. 2A includes a single processor 225, multiple processors 225 may be included. Other processors, operating systems, sensors, displays, and physical configurations may be possible.

The memory 227 stores instructions or data that may be executed by the processor 225. The memory 227 is coupled to the bus 220 for communication with the other components via a signal line 244. The instructions or data may include code for performing the techniques described herein. The memory 227 may be a dynamic random access memory (DRAM) device, a static random access memory (SRAM) device, flash memory, or some other memory device. In some embodiments, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2A, the memory 227 stores one or more of the following: driver information 293; external sensor data 295; driver preference data 298; type data set 291; GUI data 297; and driver view data 299.

The driver information 293 may include sensor data captured by one or more internal sensors of the sensor set 212. The driver information 293 may describe the driver. The driver information 293 may describe, among other things, the eye orientation of the driver relative to the 3D HUD 231.

The external sensor data 295 may include sensor data captured by one or more of the following entities: (1) one or more external sensors of the sensor set 212; (2) one or more external sensors of a second vehicle; and (3) one or more external sensors of an RSU.

The external sensor data 295 may describe a vehicle environment. The external sensor data 295 may describe, for example, one or more interested objects and one or more occluding objects. The external sensor data 295 may also describe a first vehicle. For example, the external sensor data 295 may describe a location of the first vehicle.

The driver preference data 298 may describe one or more preferences of a driver of the first vehicle. The driver preference data 298 may describe an importance threshold. The importance threshold may vary, for example, based on the time of day, day of week. external illumination level of the vehicle environment or other factors. The driver preference data 298 may describe colors or other information which the driver prefers for the generation of one or more first graphics and one or more second graphics.

The type data set 291 may any data necessary to determine a type for an interested object and an importance of that object. For example, the type data set 291 may include object priors used to determine a type for an interested object and a table, or some other data structure, used to determine an importance for that type of object.

The GUI data 297 may include graphical data used to generate graphics for display on the 3D HUD 231. For example, the GUI data 297 may include graphical data used to generate one or more of the first graphic and the second graphic.

The driver view data 299 may include any data necessary to determine one or more Cartesian coordinates used to determine where to display graphics on the 3D HUD 231 relative to the vision of the driver.

In some embodiments, the memory 227 may store the sensor data 181 described above with reference to FIGS. 1A-1F. For example, the following elements may be components of the sensor data 181: the driver information 293; the external sensor data 295; and the driver view data 299.

The 3D HUD 231 is described in more detail below with reference to FIG. 2B. The 3D HUD 231 may be communicatively coupled to the bus 220 via a signal line 232.

The sensor set 212 may include one or more of the following vehicle sensors: an external microphone; an internal microphone; an external camera; an internal camera; a LIDAR sensor; a laser-based range finder; a laser altimeter; a navigation sensor (e.g., a global positioning system sensor of the DSRC-compliant GPS unit that is accurate to within 1.5 meters, as opposed to being accurate to within 10 meters as is the case for non-DSRC-compliant GPS units); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor. The sensor set 212 may include one or more of any type of the sensors listed above.

The sensor set 212 may be operable to record sensor data 181 that describes one or more of the following: the sensor data 181 described above with reference to FIGS. 1A-1F; the driver information 293; the external sensor data 295; and the driver view data 299.

In some embodiments, the sensor set 212 may include one or more digital cameras for capturing the images necessary to provide the sensor data 181, the driver information 293, the external sensor data 295 and the driver view data 299. The one more cameras may capture images of what the driver 125 sees when viewing the 3D HUD 231. In some embodiments, the one images may include stereoscopic images for generating panoramas used to provide virtual reality content for display on the 3D HUD 231.

In some embodiments, at least one of the cameras is a digital camera mounted to the interior of the first vehicle 103 and configured to monitor the gaze of the driver 125 and determine which region of the 3D HUD 231 the driver 125 is viewing. For example, the interior camera records the driver's face and, in particular, the driver's eyes and their gaze relative to the 3D HUD 231. The camera may also record what the driver sees when looking at the 3D HUD 231 (e.g., the interested object). The camera may include a LIDAR or range finder used to determine a range or distance separating the driver's eyes (or a point in between the driver's eyes) and the portion of the 3D HUD where an interested object is located or where a graphic may be displayed.

In some embodiments, the sensor set 212 may be communicatively coupled to the bus 220 via a signal line 247.

The communication unit 245 may include hardware that transmits and receives data to and from the network 105. In some embodiments, the communication unit 245 includes a port for direct physical connection to the network 105 or to another communication channel. For example, the communication unit 245 includes a USB, SD, CAT-5, or similar port for wired communication with the network 105. In some embodiments, the communication unit 245 includes a wireless transceiver for exchanging data with the network 105 or other communication channels using one or more wireless communication methods, including IEEE 802.11, IEEE 802.16, Bluetooth, or another suitable wireless communication method.

In some embodiments, the communication unit 245 includes a port for direct physical connection to the network 105 or to another communication channel. For example, the communication unit 245 includes a USB, SD, CAT-5, or similar port for wired communication with the network 105.

In some embodiments, the communication unit 245 includes a wireless transceiver for exchanging data with the network 105 or other communication channels using one or more wireless communication methods, including: IEEE 802.11; IEEE 802.16, Bluetooth; EN ISO 14906:2004 Electronic Fee Collection—Application interface EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 245 may include a full-duplex coordination system as described in U.S. patent application Ser. No. 14/471,387 filed on Aug. 28, 2014 and entitled "Full-Duplex Coordination System."

In some embodiments, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, millimeter wave, DSRC, etc.

The communication unit 245 may be communicatively coupled to the bus 220 via a signal line 246.

The occlusion application 199 may comprise one or more of the following elements: a communication module 202; a sensor module 204; a coordinate transformation module 206; a location module 208; a situation assessment module 210; and an occlusion evaluation module 211.

The communication module 202 is communicatively coupled to the bus 220 via a signal line 222. The sensor module 204 is communicatively coupled to the bus 220 via a signal line 224. The coordinate transformation module 206 is communicatively coupled to the bus 220 via a signal line 226. The location module 208 is communicatively coupled to the bus 220 via a signal line 228. The situation assessment module 210 is communicatively coupled to the bus 220 via a signal line 229. The occlusion evaluation module 211 is communicatively coupled to the bus 220 via a signal line 230.

The communication module 202 can be software including routines for handling communications between the occlusion application 199 and other components of the computer system 200. In some embodiments, the communication module 202 can be a set of instructions executable by the processor 225 to provide the functionality described below for handling communications between the occlusion application 199 and other components of the computer system 200. In some embodiments, the communication module 202 can be stored in the memory 227 of the computer system 200 and can be accessible and executable by the processor 225.

The communication module 202 receives data and transfers the data, via the communication unit 245, to the other components of the operating environment 100. For example, the communication module 202 transmits the driver information 293 to the coordinate transformation module 206.

The communication module 202 receives data and transfers the data to the other components of the computer system 200.

The communication module 202 may communicate with the network 105 via the communication unit 245. For example, the communication module 202 a portion of the external sensor data 295 from the network 105.

The sensor module 204 can be software including routines for collector sensor data that is used by the occlusion application 199 to provide its functionality. The sensor module 204 may control the operation of the sensor set 212. The sensor module 204 may organize the sensor data into different categories such as the driver information 293, the external sensor data 295 and the driver view data 299. In some embodiments, the sensor module 204 can be stored in the memory 227 of the computer system 200 and can be accessible and executable by the processor 225.

The coordinate transformation module 206 can be software including routines for transforming the driver view data 299 to data that describes the driver's eye position coordinates. For example, the coordinate transformation module 206 may receive the driver view data 299 as an input and output a Cartesian coordinate that describes a location on the 3D HUD 231 where a first graphic or a second graphic should be displayed for viewing by the driver. The driver view data 299 can be images from color or depth cameras, or distance information from laser or LIDAR sensors. In some embodiments, the coordinate transformation module 206 may determine the driver state by determining how to position graphics on the 3D HUD relative to the vision of the driver.

In some embodiments, the coordinate transformation module 206 may include software including routines for determining which region of the 3D HUD 231 the driver is viewing at a given time. For example, the sensor set 212 may include an internal camera that captures an image of the driver. The image may be oriented to enable the coordinate transformation module 206 to identify which region of the 3D HUD 231 the eyes of the driver are viewing at one or more times.

In some embodiments, the coordinate transformation module 206 may continuously monitor which portion of the 3D HUD 231 the driver is viewing and cause the communication module 202 to continuously provide signals to one or more other elements of the occlusion application 199 that describes this information. For example, based on instruction by the coordinate transformation module 206, the communication module 202 may provide a signal to one or more of the location module 208 or the occlusion evaluation module 211 that describes a Cartesian coordinate describing which portion of the 3D HUD 231 the driver is viewing. In this way these elements may determine, relative to the view of the driver, where a first graphic should be displayed on the 3D HUD 231 so that it overlays an interested object, whether an interested object is occluded by an occluding object as viewed by the driver when looking at the 3D HUD 231, where a second graphic should be displayed on the 3D HUD, etc.

In some embodiments, the coordinate transformation module 206 can be stored in the memory 227 of the computer system 200 and can be accessible and executable by the processor 225.

The location module 208 may include code and routines for monitoring and tracking the location of different objects in the vehicle environment. For example, the sensor module 204 may ensure that the external sensor data 295 is updated on a continuing basis and the location module 208 may continuously evaluate and track the location of the different objects in the vehicle environment relative to one another. The location of the objects in the vehicle environment may be determined relative to the location of the first vehicle. The objects may include one or more interested objects and one or more occluding objects.

In some embodiments, the location module 208 may also determine the location of the first vehicle. For example, the location module 208 may call a GPS unit of the first vehicle (which may be an element of the sensor set 212) and receive GPS-based location data describing the location of the first vehicle. The GPS may be DSRC-compliant. The location module 208 may then use external sensor data 295 describing a range from the first vehicle to one or more objects in the vehicle environment over time (such as provided by a LIDAR sensor or some other range finder) to track the location of these objects relative to one another and the first vehicle. The relative ranges of different objects may indicate whether an object may be an occluding object for an interested object since, for example, the relative ranges of the objects may show that one is in front of the other such that the closer object may occlude the further object, thereby indicating that the closer object may be an occluding object. In this way the location module 208 may more use the enhanced accuracy of DSRC-compliant GPS data to more accurately determine the location of different objects in the vehicle environment.

In some embodiments, the location module 208 may include software including routines for determining a shape of an interested object. This shape information may be used, for example, to generate a first graphic that overlays the interested object in a way that is visually similar to the interested object.

In some embodiments, the location module 208 may generate the GUI data 297 for the first graphic. The location module 208 may cause the communication module 202 to provide the GUI data 297 for the first graphic to the 3D HUD 231.

In some embodiments, the communication module 202 may provide a signal to the location module 208 including a Cartesian coordinate describing which portion of the 3D HUD 231 the driver is viewing. The location module 208 or the coordinate transformation module 206 may instruct the 3D HUD 231 on where to display the first graphic in the 3D HUD 231 to correspond to the location of the interested object in the real world relative to how the driver of the first vehicle is looking at the 3D HUD 231. The location for displaying the first graphic may be configured so that the first graphic overlays the interested object.

In some embodiments, the location module 208 may continuously track the location of an interested object relative to an occluding object and the view of the driver (which may be continuously updated by the communication module 202, as instructed by the coordinate transformation module 206, by continuously providing a Cartesian coordinate describing the driver's view of the 3D HUD 231). For example, a first graphic may be displayed on the 3D HUD 231 for an interested object and the location module 208 may track the location of the interested object relative to an occluding object (and, optionally, the view of the driver) to assist the occlusion evaluation module 211 in determining whether the interested object is occluded by the occluding object (e.g., because the interested object is located behind the occluding object such that the driver would not be able to see at least a portion of the interested object because of the presence of the occluding object in front of the interested object relative to the vision of the driver). If the location module 208 determines that the interested object is occluded by the occluding object, then the location module 208 may cause the communication module 202 to provide a signal to the occlusion evaluation module 211 to assist the occlusion evaluation module 211 in providing its functionality.

In some embodiments, the location module 208 can be stored in the memory 227 of the computer system 200 and can be accessible and executable by the processor 225.

In some embodiments, the situation assessment module 210 may include software including routines for determining whether an interested object is sufficiently important (or critical) for the driver to see even if the interested object is occluded by an occluding object.

In some embodiments, the situation assessment module 210 may include software including routines for evaluating the external sensor data 295 to perform one or more of the following steps: identify an interested object; determine a type for the interested object; determine an importance value for the determined type; retrieve an importance threshold from the memory 227; and compare the importance value to the importance threshold to determine whether the interested object is sufficiently important that a second graphic should be generated for the interested object.

In some embodiments the situation assessment module 210 may assign an assessment score to the interested object. The assessment score may be assigned based on the comparison of the importance value to the importance threshold. The assessment score may be a value that indicates whether the second graphic should be generated for the interested object if the interested object is occluded by an occluding object as viewed by the driver when looking at the 3D HUD 231. The assessment score may be binary. For example, an assessment score equal to "1" may indicate that the interested object is sufficiently important to generate the second graphic (e.g., because the threshold was met or exceeded) and an assessment score equal to "0" may indicate that the interested object is not sufficiently important to generate the second graphic (e.g., because the threshold was not met or exceeded). The assessment score may take other forms not described here.

In some embodiments, the situation assessment module 210 may cause the communication module 202 to a signal to the occlusion evaluation module 211 that describes or indicates whether the interested object is sufficiently important to generate the second graphic. For example, the communication module 202 may provide one or more signals to the occlusion evaluation module 211 that describes or indicates one or more of the following: whether the interested object is located behind an occluding object; the location of the interested object; the location of the occluding object; a Cartesian coordinate describing which portion of the 3D HUD 231 the driver is viewing; and whether the importance value for the interested object exceeds the importance threshold (e.g., this may include the assessment score, which may beneficially require a single bit of data be included in the signal from the communication module 202 since the assessment score may be binary).

In some embodiments, the situation assessment module 210 can be stored in the memory 227 of the computer system 200 and can be accessible and executable by the processor 225.

In some embodiments, the occlusion evaluation module 211 may include software including routines for determining whether the 3D HUD 231 should display the second graphic and where the second graphic should be displayed on the 3D HUD 231. For example, the occlusion evaluation module 211 may receive one or more signals from the communication module 202 describing one or more of the following: whether the interested object is located behind an occluding object; the location of the interested object; the location of the occluding object; a Cartesian coordinate describing the orientation of the driver's gaze relative to the 3D HUD 231 (and optionally any objects viewable by the driver when looking at the 3D HUD 231); and whether the importance value for the interested object exceeds the importance threshold. Based on this data the occlusion evaluation module 211 may determine whether to display the second graphic for the interested object while the interested object is occluded and where the second graphic should be displayed by the 3D HUD 231.

For example, if the interested object is occluded by an occluding object and the interested object is sufficiently important, then the occlusion evaluation module 211 may generate GUI data 297 for causing the 3D HUD 231 to display the second graphic. The occlusion evaluation module 211 may cause the communication module 202 to provide the GUI data 297 for the second graphic to the 3D HUD 231. The occlusion evaluation module 211 may cause the 3D HUD 231 to display the second graphic at a particular location of the 3D HUD 231. The location may be selected by the occlusion evaluation module 211 so that the second graphic does not overlay one or more of the occluding object or the interested object while also indicating to the driver that the interested object is located behind the occluding object. See, for example, FIG. 1E.

The occlusion evaluation module 211 may cause the 3D HUD 231 to modify the position of the second graphic as one or more of the interested object, the occluding object, the vehicle and the view of the driver move over time.

In some embodiments, the occlusion evaluation module 211 can be stored in the memory 227 of the computer system 200 and can be accessible and executable by the processor 225.

In some embodiments, the computer system 200 may include one or more of the modules and/or data described in U.S. patent application Ser. No. 15/080,412 filed on Mar. 24, 2016 and entitled "Three Dimensional Graphical Overlays for a Three Dimensional Heads-up Display Unit of a Vehicle," the entirety of which is hereby incorporated by reference.

In some embodiments, the computer system 200 may include one or more of the modules and/or data described in U.S. patent application Ser. No. 15/080,394 filed on Mar. 24, 2016 and entitled "Three Dimensional Heads-up Display Unit Including Visual Context for Voice Commands," the entirety of which is hereby incorporated by reference.

Figure 2B:
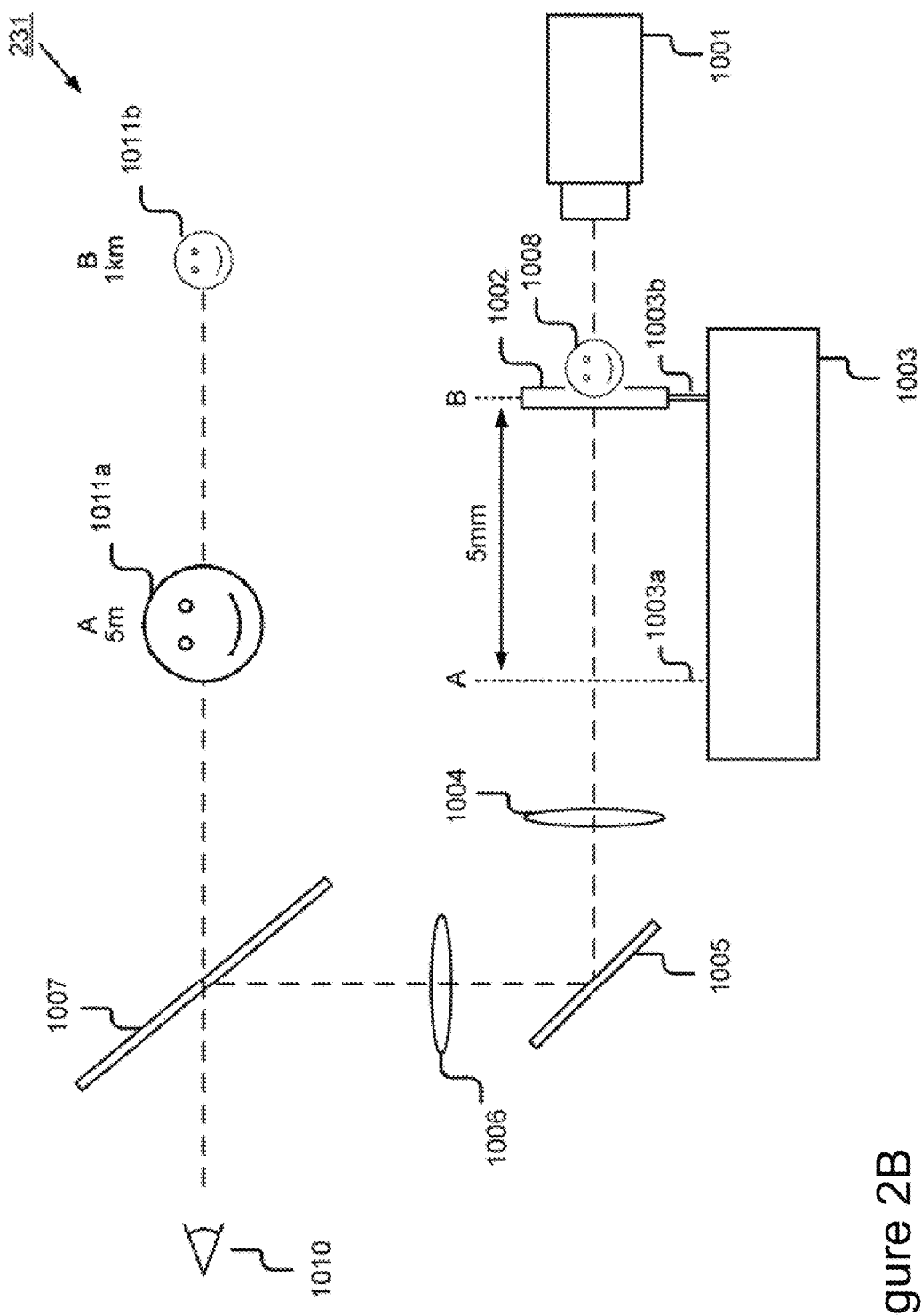
FIG. 2B is a block diagram illustrating an 3D HUD according to some embodiments.

Referring to FIG. 2B, depicted is a block diagram illustrating an 3D HUD 231 according to some embodiments.

In some embodiments, the 3D HUD 231 includes a projector 1001, a movable screen 1002, a screen-driving unit 1003, an optical system (including lenses 1004, 1006, reflector 1005, etc.). The projector 1001 may be any kind of projector such as a digital mirror device (DMD) project, a liquid crystal projector. The projector 1001 projects an image (graphic) 1008 on the movable screen 1002. The movable screen 1002 includes a transparent plate and so the projected image lights transmit through the movable screen 1002 to be projected on the windshield 1007 of a vehicle (first vehicle 103). The image projected on the windshield 1007 is perceived by a driver 1010 as if it is a real object (shown as 1011a, 1011b) that exists in the three-dimensional space of the real world, as opposed to an object that is projected on the windshield.

In some embodiments, the 3D HUD 231 is capable of controlling the direction of the image relative to the driver 1010 (in other words, the image position in the windshield) by adjusting the projection position on the screen 1002. Further the screen 1002 is movable by the screen-driving unit 1003 in the range between the positions 1003a and 1003b. Adjusting the position of the screen 1002 can vary the depth (distance) of the projected image from the driver 1010 in the real world. In one example, the movable range of the screen 1002 (distance between positions 1003a and 1003b) may be 5 mm, which correspond to from 5 m away to infinity in the real world. The use of the 3D HUD 231 allows the driver 1010 to perceive the projected image exist in the real world (three-dimensional space). For example, when an image is projected at the same three-dimensional position (or substantially same depth at least) as a real object (such as a pedestrian, car, etc.), the driver does not need to adjust eye focus in order to view the projected image, resulting in easy grasp of the projected image while looking at the real object.

The 3D HUD 231 depicted in FIG. 2B is provided by way of example. Other examples are possible. These examples may include heads-up displays having more or less complexity than the 3D HUD 231 depicted in FIG. 2B. For example, it is anticipated that in the future there will be heads-up displays that do not require movable parts such as the movable screen 1002. For example, a static screen that does not move may be deployed. The heads-up display deployed may not be a two-dimensional heads-up display unit. The occlusion application 199 described above with reference to FIG. 2A is designed to be operable with such components.

Figure 2C:
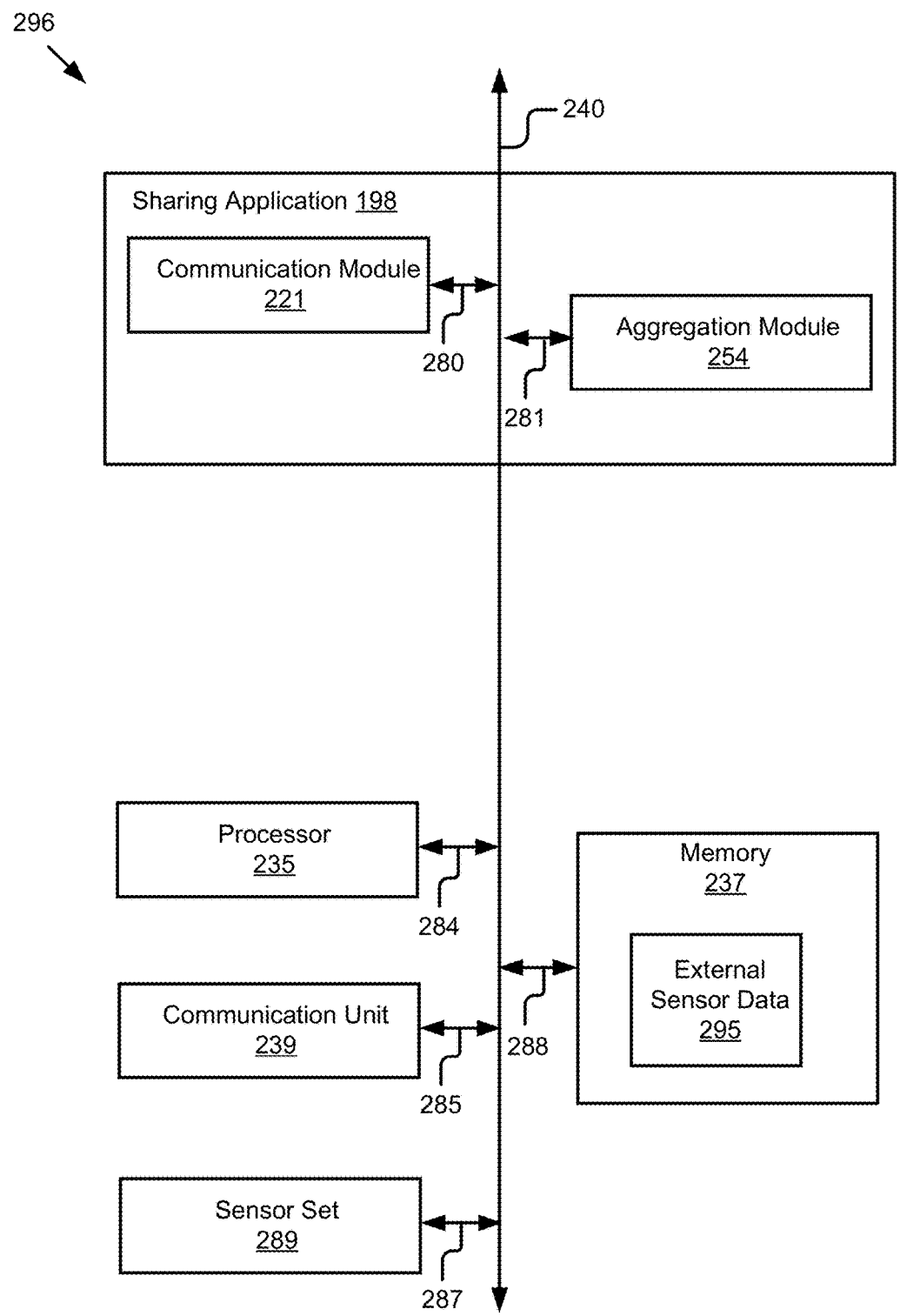
FIG. 2C is a block diagram illustrating an example computer system including a sharing application according to some embodiments.

Referring now to FIG. 2C, depicted is a block diagram illustrating an example computer system 296 including a sharing application 198 according to some embodiments. As depicted, the computer system 296 includes the sharing application 198, a processor 235, a memory 237, a sensor set 289 and a communication unit 239. The computer system 296 may include second vehicle 106 or the RSU 101. The components of the computer system 296 are communicatively coupled by a bus 240.

The processor 235, sensor set 289 and the communication unit 239 are similar to the processor 225, sensor set 212 and the communication unit 245 that are discussed with reference to FIG. 2A and, so, these descriptions will not be discussed again. The processor 235 is communicatively coupled to the bus 240 via a signal line 284. The sensor set 289 is communicatively coupled to the bus 240 via a signal line 287. The communication unit 239 is communicatively coupled to the bus 240 via a signal line 285. The memory 237 is communicatively coupled to the bus 240 via a signal line 288.

The memory 237 stores instructions or data that may be accessed and executed by the processor 235. The memory 237 is coupled to the bus 240 for communication with the other components via a signal line 288. The instructions or data may include code for performing the techniques described herein. The memory 237 may be a dynamic random access memory (DRAM) device, a static random access memory (SRAM) device, flash memory, or some other memory device. In some embodiments, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2C, the memory 237 may store the external sensor data 295. The external sensor data 295 was described above with reference to FIG. 2A, and so, that description will not be repeated here. The external sensor data 295 may be captured by the sensor set 289 and stored in the memory 237. In some embodiments, the sharing application 198 may share the external sensor data 295 with the first vehicle 103 via the network 105. For example, the communication unit 239 may provide the external sensor data 295 to the network 105 via DSRC, wireless full-duplex communication, 3G, 4G, Wi-Fi or some other wireless communication supported by the communication unit 239.

In some embodiments, the sharing application 198 includes a communication module 221 and an aggregation module 254.

The communication module 221 may be communicatively coupled to the bus 240 via a signal line 280. The aggregation module 254 may be communicatively coupled to the bus 240 via a signal line 281.

The communication module 221 can be software including routines for handling communications between the sharing application 198 and other components of the computer system 296. In some embodiments, the communication module 221 can be a set of instructions executable by the processor 235 to provide the functionality described below for handling communications between the sharing application 198 and other components of the computer system 296. In some embodiments, the communication module 221 can be stored in the memory 237 of the computer system 296 and can be accessible and executable by the processor 235.

The communication module 221 sends and receives data, via the communication unit 239, to and from one or more of the elements of the operating environment 100. For example, the communication module 221 causes the communication unit 239 to transmit the external sensor data 295 to the network 105 so that the first vehicle 103 may receive the external sensor data 295 from the network 105.

In some embodiments, the communication module 221 receives data from components of the computer system 296 and stores the data in the memory 237. For example, the communication module 221 receives the external sensor data 295 from the sensor set 289 and stores the external sensor data 295 in the memory 237.

In some embodiments, the communication module 221 may handle communications between components of the sharing application 198.

The aggregation module 254 can be software including routines for causing the sensor set 289 to collect the external sensor data 295. The aggregation module 254 may coordinate which of the sensors of the sensor set 289 are active at a given time. The aggregation module 254 may analyze the external sensor data 295 to determine if it includes data that is useful to the first vehicle 103. For example, if the external sensor data 295 includes images of an interested object or an occluding object, then the aggregation module 254 may determine that the external sensor data 295 is useful for the first vehicle 103. Images that indicate the location of an interested object behind an occluding object as the interested object is presently occluded may be particularly beneficial to the first vehicle 103 since it may assist in determine where to place the second graphic on the 3D HUD. The aggregation module 254 may signal the communication module 221 to transmit the external sensor data 295 to the network 105 for receipt by the first vehicle 103. The communication module 221 may cause the communication unit 239 to transmit a wireless message to the network 105 that includes the external sensor data 295.

In some embodiments, the aggregation module 254 can be stored in the memory 237 of the computer system 296 and can be accessible and executable by the processor 235.

Methods

Figure 3A:
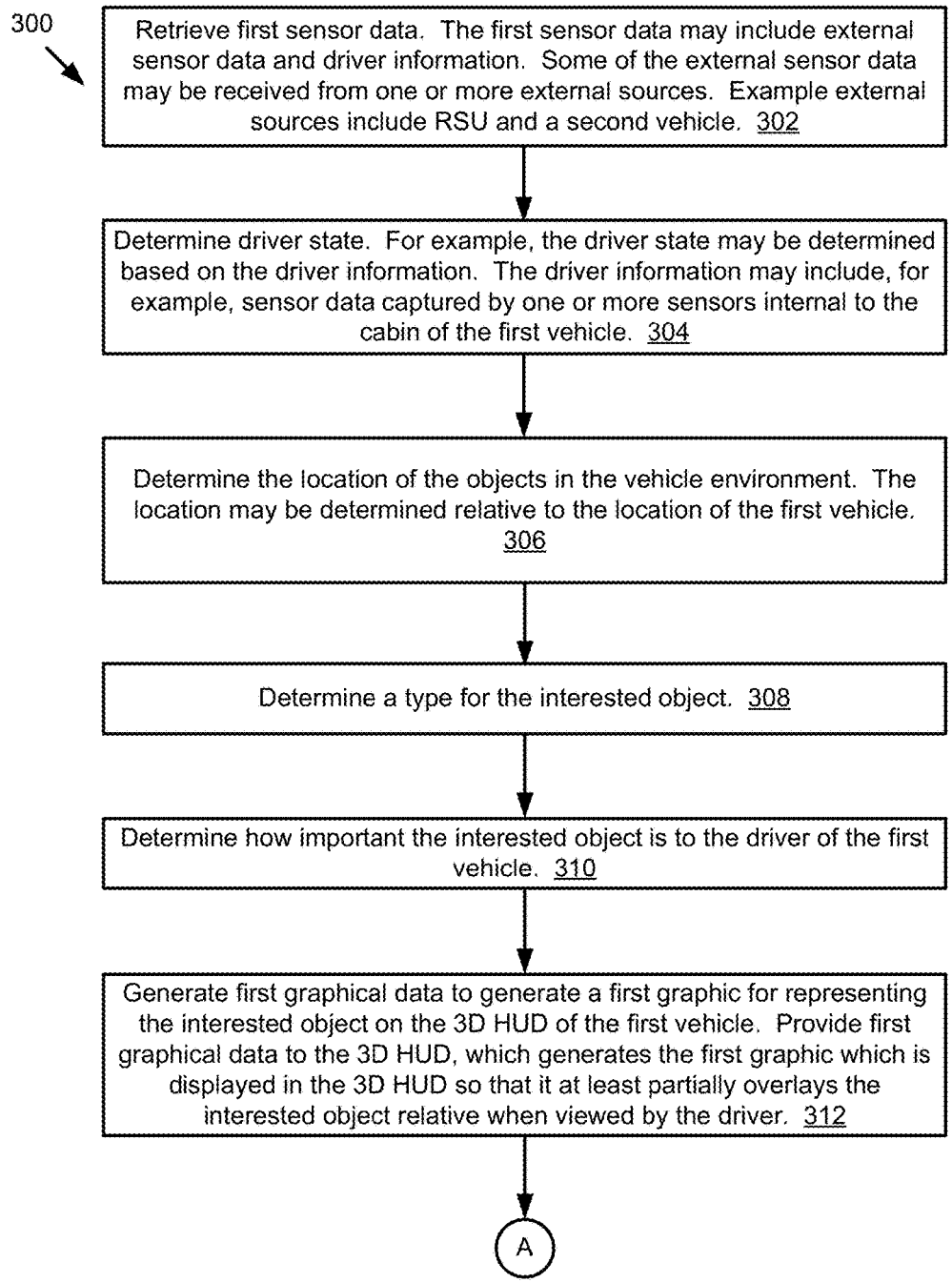
FIGS. 3A-3C are a flowchart of an example method for providing occlusion adjustment for a graphic of a 3D HUD according to some embodiments.
Figure 3B:
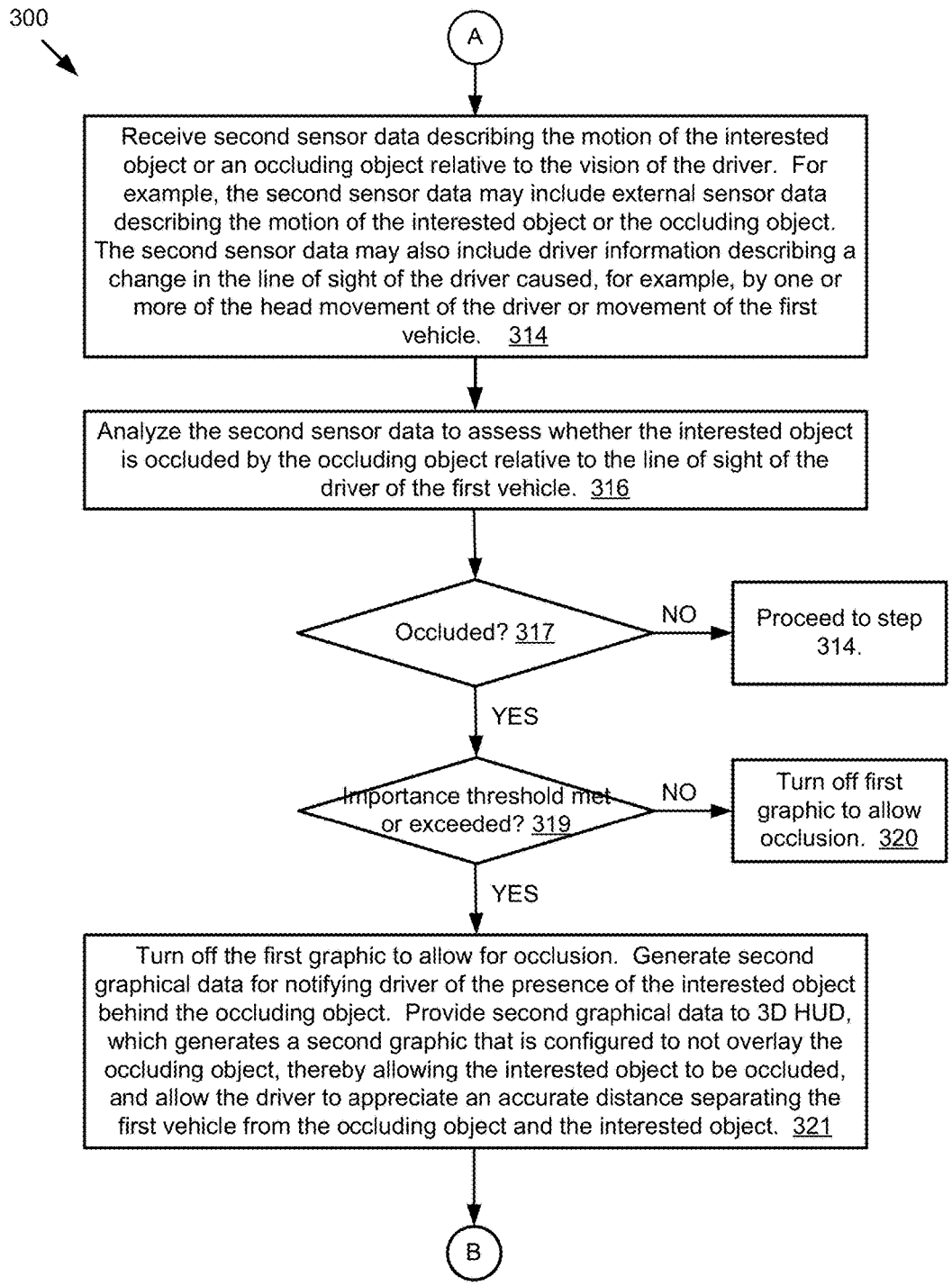
Figure 3C:
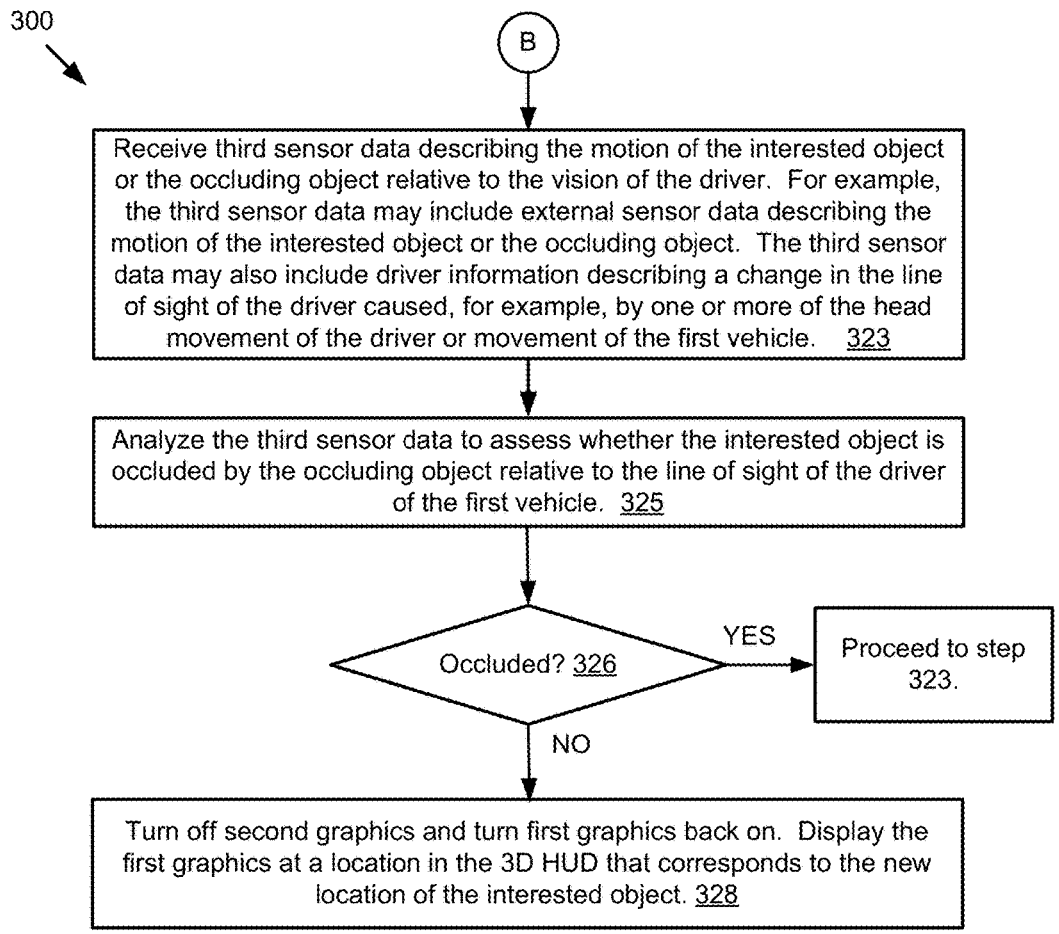

FIGS. 3A-3C are a flowchart of an example of a method 300 for providing occlusion adjustment for a graphic of a 3D HUD according to some embodiments.

At step 302 the first sensor data is received. The first sensor data may include external sensor data and driver information. Some of the external sensor data may be received from one or more external sources. Example external sources may include a RSU or a second vehicle.

At step 304 the driver state may be determined. For example, the driver state may be determined based on the driver information. The driver information may include, for example, sensor data captured by one or more sensors internal to the cabin of the vehicle. The driver state may include information describing one or more of the following: how the driver is viewing the 3D HUD; an orientation of the driver's view of the 3D HUD (e.g., as described by a Cartesian coordinate); and what the driver sees when looking at the 3D HUD.

At step 306 the location of the objects in the vehicle environment may be determined. The objects may include one or more of the following: one or more interested objects; one or more occluding objects; and the first vehicle. The location of the interested object and the occluding object may be determined relative to the first vehicle and one another. GPS data for the location of the first vehicle may be used. The GPS data may be collected using a DSRC-compliant GPS unit.

At step 308 a type for the interested object may be determined. For example, the sensor data may include an image of the interested object. The image may be compared to one or more object priors to determine which of the object priors matches, or substantially matches, the interested object. Each object prior may be associated with a different type. Each type may be associated with an importance value. A confidence factor may be determined for the matching of the interested object to the object prior.

At step 310 the importance of the interested object may be determined. For example, the importance of different types of objects may be predetermined. The importance may be based on a preference of the driver or a designer of the system that performs the method 300. For example, a driver may provide inputs that affect the assignment of importance values to different types of objects. In some embodiments, a memory may store an importance threshold. The importance threshold may be compared to the importance value for the type determined in step 308. The interested object may be sufficiently important if the threshold is met or exceeded. In some embodiments, the importance threshold may be determined by the driver preference or a preference of the designer of the system that implements the method 300.

At step 312, first graphical data may be generated. The first graphical data may be configured to cause a 3D HUD to generate a first graphic representing an interested object. The first graphical data may be provided to the 3D HUD. The 3D HUD may generate the first graphic so that it at least partially overlays the interested object when the driver looks at the interested object through the 3D HUD.

Referring now to FIG. 3B, at step 314 the second sensor data may be received. The second sensor data may describe a motion of the interested object or an occluding object relative to the vision of the driver. For example, the second sensor data may include external sensor data describing the motion of the interested object or the occluding object in the vehicle environment. The second sensor data may also include driver information describing a change in the line or sight of the driver caused, for example, by one or more of the head movement of the driver or the movement of the first vehicle (e.g., a bumpy road).

At step 316 the second sensor data may be analyzed to assess whether the interested object is occluded by the occluding object relative to the line or sight of the driver of the first vehicle. The line of sight of the driver may be indicated by driver information included in the second sensor data.

At step 317, a determination may be made regarding whether the interested object is occluded by the occluding object relative to the line of sight of the driver. If the interested object is not occluded at step 317, the method 300 may proceed to step 314. If the interested object is occluded at step 317, the method 300 may proceed to step 319.

At step 319 a determination may be made regarding whether the importance threshold is met or exceeded for the interested object which is now determined to be occluded. If the importance threshold is not met or exceeded at step 319, then the method 300 may proceed to step 320 where the first graphic may be turned off so that the interested object is allowed to be occluded by the occluding object. If the importance threshold is met or exceeded at step 319, then the method 300 may proceed to step 321.

At step 321 the first graphic may be turned off so that no graphic overlays the occluding object. Second graphical data may be generated for displaying a second graphic. The second graphic, when displayed by the 3D HUD, may notify the driver of the presence of the interested object behind the occluding object without overlaying the occluding object. This may beneficially allow the driver to be aware of the presence of an important object behind the occluding object without confusing the driver about the location of the interested object.

Referring now to FIG. 3C, at step 323 third sensor data may be received. The third sensor data may describe the motion of the interested object or the occluding object relative to the vision of the driver. For example, the third sensor data may include external sensor data describing the motion of the interested object or the occluding object. The third sensor data may also include driver information describing a change in the line of sight of the driver caused, for example, by one or more of the head movement of the driver or movement of the first vehicle.

At step 325 the third sensor data may be analyzed to assess whether the interested object is occluded by the occluding object relative to the line of sight of the driver of the first vehicle.

At step 326, a determination may be made regarding whether the interested object continues to be occluded by the occluding object. If the interested object is determined to be occluded at step 326, then the method 300 proceeds to steps 323 where additional third sensor data may be received and later analyzed. If the interested object is determined to be not occluded at step 326, then the method 300 may proceed to step 328.

At step 328 the second graphic may be turned and the first graphic may be turned back on. The first graphic may be displayed on the 3D HUD at a location that corresponds to the new location of the interested object in the vehicle environment.

Referring now to FIG. 1A, one or more of the following devices may be a communication device: a first vehicle 103; a second vehicle 106 and an RSU 101. Regarding U.S. patent application Ser. No. 14/471,387 filed on Aug. 28, 2014 and entitled "Full-Duplex Coordination System," in a half-duplex communication system, a first communication device currently transmitting data to a second communication device is not capable of simultaneously receiving data from the second communication device. If the second communication device has data to transmit to the first communication device, the second communication device needs to wait until the first communication device completes its data transmission. Only one communication device is allowed to transmit data at one time in the half-duplex communication system.

In a standard IEEE 802.11 Wireless Local Area Network (WLAN), communication devices may compete for access to a wireless channel based on the Carrier Sense Multiple Access with Collision Avoidance (CSMA/CA) Medium Access Control (MAC) protocol. The IEEE 802.11 MAC protocol requires that only one communication device may use the wireless channel to transmit data at one time. If two or more communication devices transmit data over the wireless channel at the same time, a collision occurs. As a result, only the communication device that currently gains access to the wireless channel may use the wireless channel to transmit data. Other communication devices having data to transmit need to monitor the wireless channel and may compete for access to the wireless channel when the wireless channel becomes idle again.

According to one innovative aspect of the subject matter described in this disclosure, the first vehicle 103, the second vehicle 106 and the RSU 101 as described above may include a full duplex coordination system for implementing full-duplex wireless communications. The full duplex coordination system may include a processor and a memory storing instructions that, when executed, cause the full duplex coordination system to: create, at a first communication device (such as the second vehicle 106 or the RSU 101, etc.), first data (such as external sensor data 295) to transmit to a second communication device (such as the first vehicle 103, etc.); switch a half-duplex operation mode of the first communication device to a full-duplex operation mode to activate the full-duplex operation mode of the first communication device; transmit a first portion of the first data from the first communication device to the second communication device using a wireless channel; and transmit, in the full-duplex operation mode of the first communication device, a remaining portion of the first data to the second communication device while simultaneously receiving second data (such as a notification of receipt of the external sensor data 295 or a request for additional external sensor data 295 for a later point in time) from the second communication device using the wireless channel.

According to another innovative aspect of the subject matter described in this disclosure, a full duplex coordination system for implementing full-duplex wireless communications includes a processor and a memory storing instructions that, when executed, cause the full duplex coordination system to: receive a first portion of first data (such as any combination of the data stored on the memory 237) from a first communication device via a wireless channel; determine that a second communication device is a single destination of the first data based on the first portion of the first data; determine that the second communication device has second data (such as a notification of receipt or a request for additional external sensor data 295) to transmit to the first communication device; determine that the first communication device has full-duplex communication capability; switch a half-duplex operation mode of the second communication device to a full-duplex operation mode to activate the full-duplex operation mode of the second communication device; and transmit, in the full-duplex operation mode of the second communication device, the second data to the first communication device while simultaneously receiving a remaining portion of the first data from the first communication device using the wireless channel.

In general, another innovative aspect of the subject matter described in this disclosure may be embodied in methods that include: creating, at a first communication device, first data to transmit to a second communication device; switching a half-duplex operation mode of the first communication device to a full-duplex operation mode to activate the full-duplex operation mode of the first communication device; transmitting a first portion of the first data from the first communication device to the second communication device using a wireless channel; and transmitting, in the full-duplex operation mode of the first communication device, a remaining portion of the first data to the second communication device while simultaneously receiving second data from the second communication device using the wireless channel.

Yet another innovative aspect of the subject matter described in this disclosure may be embodied in methods that include: receiving a first portion of first data from a first communication device via a wireless channel; determining that a second communication device is a single destination of the first data based on the first portion of the first data; determining that the second communication device has second data to transmit to the first communication device; determining that the first communication device has full-duplex communication capability; switching a half-duplex operation mode of the second communication device to a full-duplex operation mode to activate the full-duplex operation mode of the second communication device; and transmitting, in the full-duplex operation mode of the second communication device, the second data to the first communication device while simultaneously receiving a remaining portion of the first data from the first communication device using the wireless channel.

Another innovative aspect of the subject matter described in this disclosure may be embodied in methods that include: determining first data to transmit from a first communication device to a second communication device; and transmitting, from the first communication device that operates in a full-duplex operation mode, the first data to the second communication device while simultaneously receiving second data from the second communication device using a common wireless channel.

Another innovative aspect of the subject matter described in this disclosure may be embodied in methods that include: receiving, from a first communication device, first data at a second communication device via a wireless channel; determining second data to transmit from the second communication device to the first communication device responsive to receiving at least a portion of the first data; and transmitting, from the second communication device that operates in a full-duplex operation mode, the second data to the first communication device using the wireless channel while simultaneously receiving the first data from the first communication device.

Another innovative aspect of the subject matter described in this disclosure may be embodied in methods that include: determining, at a first communication device, first data to transmit to a second communication device; switching the first communication device from a half-duplex operation mode to a full-duplex operation mode; transmitting, in the full-duplex operation mode of the first communication device, the first data to the second communication device while simultaneously receiving second data from the second communication device using the wireless channel; and switching the full-duplex operation mode of the first communication device to the half-duplex operation mode responsive to a determination that transmission of the first data completes.

Another innovative aspect of the subject matter described in this disclosure may be embodied in methods that include: receiving, from a first communication device, first data at a second communication device via a wireless channel; determining that the second communication device has second data to transmit to the first communication device; switching the second communication device from a half-duplex operation mode to a full-duplex operation mode; transmitting, in the full-duplex operation mode of the second communication device, the second data to the first communication device while simultaneously receiving the first data from the first communication device using the wireless channel; and switching the full-duplex operation mode of the second communication device to the half-duplex operation mode responsive to a determination that transmission of the second data completes.

Other aspects include corresponding methods, systems, apparatus, and computer program products for these and other innovative aspects.

These and other embodiments may each optionally include one or more of the following operations and features. For instance, the features include: the first data including a first packet and the first portion of the first data including a header portion of the first packet; the remaining portion of the first data including a payload portion and a trailer portion of the first packet; determining that the second communication device is a single destination of the first data; activating the full-duplex operation mode of the first communication device responsive to the second communication device being the single destination of the first data; the first communication device and the second communication device being communication devices in a wireless local area network; determining that the first communication device operates in a regulated spectrum where full-duplex communication capability is required; receiving device registry data associated with the first communication device; determining that the first communication device has full-duplex communication capability based on the device registry data; and determining that the first communication device has full-duplex communication capability based on a capability indication field in the first portion of the first data, the capability indication field including data describing whether the first communication device has full-duplex communication capability.

For instance, the operations include: determining that the wireless channel is idle; and accessing the wireless channel for data communication between the first communication device and the second communication device based on a channel access rule.

The disclosure is particularly advantageous in a number of respects. For example, the system described herein is capable of achieving a higher throughput and a faster communication speed using full-duplex communication technologies rather than using half-duplex communication technologies. The full-duplex communication may be implemented between vehicles (e.g., communication systems installed in a first vehicle 103 or a second vehicle 106 such as is depicted in FIG. 1A) or other communication devices that have full-duplex communication capability (such as the RSU 101). In another example, the system coordinates communication between communication devices in a distributed way without using a central coordinator. The system determines a pair of communication devices and coordinates simultaneous transmission of data between the pair of communication devices so that the pair of communication devices may transmit data to each other simultaneously using the same wireless channel. Meanwhile, other communication devices may not transmit data over the wireless channel to avoid collision. The advantages of the system described herein are provided by way of example, and the system may have numerous other advantages.

The disclosure includes a system and method for implementing full-duplex wireless communications between communication devices. A full-duplex coordination system may include a processor and a memory storing instructions that, when executed, cause the full-duplex coordination system to: create, at a first communication device, first data to transmit to a second communication device; switch a half-duplex operation mode of the first communication device to a full-duplex operation mode to activate the full-duplex operation mode of the first communication device; transmit a first portion of the first data from the first communication device to the second communication device using a wireless channel; and transmit, in the full-duplex operation mode of the first communication device, a remaining portion of the first data to the second communication device while simultaneously receiving second data from the second communication device using the wireless channel.

In the above description, for purposes of explanation, numerous specific details are set forth in order to provide a thorough understanding of this disclosure. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computing device that can receive data and commands, and any peripheral devices providing services.

Reference in this disclosure to "some embodiments" or "some instances" means that a particular feature, structure, or characteristic described in connection with the embodiments or instances can be included in at least one embodiment of the description. The appearances of the phrase "in some embodiments" in various places in this disclosure are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of this disclosure can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

This disclosure can take the form of some entirely hardware embodiments, some entirely software embodiments or some embodiments containing both hardware and software elements. In some preferred embodiments, this disclosure is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device. The computer-readable medium may be a tangible or non-transitory computer-readable storage medium. The computer-readable medium may store computer executable code. The computer-readable medium may be communicatively coupled to a processor. The processor may be programmed to execute one or more portions of the computer-executable code.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, this disclosure is not described with reference to any particular programming language. It will be appreciated that a variety of programming languages may be used to implement the teachings of this disclosure as described herein.

The foregoing description of the embodiments of this disclosure has been presented for the purposes of illustration and description. It is not intended to be exhaustive or to limit this disclosure to the precise form disclosed. Many modifications and variations are possible in light of the above teaching. It is intended that the scope of the disclosure be limited not by this detailed description, but rather by the claims of this application. As will be understood by those familiar with the art, this disclosure may be embodied in other specific forms without departing from the spirit or essential characteristics thereof. Likewise, the particular naming and division of the modules, routines, features, attributes, methodologies, and other aspects are not mandatory or significant, and the mechanisms that implement this disclosure or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of this disclosure is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of this disclosure, which is set forth in the following claims.

What is claimed is:

1. A computer program product comprising a non-transitory computer-usable medium including a computer-readable program, wherein the computer-readable program when executed on a computer of a vehicle causes the computer to:
   determine a type of interested object in an environment external to the vehicle using object priors describing known objects having known types;
   determine an importance value associated with the type of interested object;
   display an initial graphic on an electronic display of the vehicle;
   determine that at least a portion of the interested object is occluded by an occluding object;
   determine, based on the importance value, that the importance value meets or exceeds an importance threshold and
   responsive to a determination that the importance value meets or exceeds the importance threshold (1) turn off the initial graphic so that the initial graphic is not displayed on the electronic display and (2) display, on the electronic display, a non-occluding graphic that does not overlay the occluding object or the interested object and that visually indicates to a driver a location of the interested object behind the occluding object when the driver is looking at the electronic display.

2. A computer-implemented method comprising:
   determining a type of interested object in an environment external to a vehicle using object priors describing known objects having known types;
   determining an importance value associated with the type of interested object;
   displaying, on an electronic display installed in the vehicle, an initial graphic that is viewable by a driver of the vehicle when looking at the electronic display;
   determining that at least a portion of an interested object is occluded by an occluding object;
   determining that the importance value meets or exceeds an importance threshold;
   responsive to a determination that the importance value meets or exceeds the importance threshold, turning off the initial graphic so that the initial graphic is not displayed on the electronic display; and
   displaying, on the electronic display, a non-occluding graphic that does not overlay the occluding object or the interested object and that visually indicates to the driver that the interested object is located behind the occluding object when the driver is looking at the electronic display.

3. The method of claim 2, wherein determining, based on the importance value, that the interested object is not allowed to be occluded by the occluding object includes determining that the importance value fails to meet or exceed an importance threshold.

4. The method of claim 2, wherein the non-occluding graphic is an arrow located above the interested object that indicates to the driver a location of the interested object behind the occluding object.

5. The method of claim 2, wherein the type of interested object is also determined based on sensor data.

6. The method of claim 2, further comprising tracking motion of the interested object using one or more vehicle sensors.

7. The method of claim 6, wherein the one or more vehicle sensors includes a camera that tracks the motion of the interested object.

8. The method of claim 7, wherein the camera tracks the motion of the interested object relative to the occluding object and the vehicle.

9. The method of claim 6, wherein the one or more vehicle sensors includes a range finder that tracks the motion of the interested object and one or more distances of the interested object relative to the occluding object and the vehicle.

10. The method of claim 6, wherein the vehicle sensors detect the interested object moving from a first position to a second position and the method further comprises repositioning a location of the non-occluding graphic as displayed on the electronic display to correspond to the second position wherein the non-occluding graphic was previously displayed on the electronic display to correspond to the first position.

11. A system comprising:
an electronic display installed in a vehicle; and
a memory storing instructions that, when executed, cause the system to:
- determine a type of interested object in an environment external to the vehicle using object priors describing known objects having known types;
- determine an importance value associated with the type of interested object;
- display, on the electronic display, an initial graphic that is viewable by a driver of the vehicle as overlaying an interested object when the driver is looking at the electronic display;
- determine that at least a portion of the interested object is occluded by an occluding object;
- determine that the importance value meets or exceeds an importance threshold;
- responsive to a determination that the importance value meets or exceeds the importance threshold, turn off the initial graphic so that the initial graphic is not displayed on the electronic display;
- display, on the electronic display, a non-occluding graphic that does not overlay the occluding object or the interested object and that visually indicates to the driver that the interested object is located behind the occluding object when the driver is looking at the electronic display;
- determine that the interested object is no longer occluded by the occluding object;
- responsive to determining that the interested object is not occluded, turn off the non-occluding graphic so that the non-occluding graphic is not displayed on the electronic display; and
- display, on the electronic display, the initial graphic, wherein the initial graphic is viewable by the driver of the vehicle as overlapping the interested object when the driver is looking at the electronic display.

12. The system of claim 11, wherein the interested object and the occluding object are located outside the vehicle.

13. The system of claim 11, wherein the interested object and the occluding object are located at least substantially in front of the vehicle.

14. The system of claim 11, wherein the non-occluding graphic also does not overlay the interested object.

15. The system of claim 11, wherein the instructions when executed cause the system to track motion of the interested object using one or more vehicle sensors.

16. The system of claim 15, wherein the one or more vehicle sensors includes a camera that tracks the motion of the interested object.

17. The system of claim 16, wherein the camera tracks the motion of the interested object relative to the occluding object and the vehicle.

18. The system of claim 15, wherein the one or more vehicle sensors includes a range finder that tracks the motion of the interested object and one or more distances of the interested object relative to the occluding object and the vehicle.

19. The system of claim 15, wherein the vehicle sensors detect the interested object moving from a first position to a second position and the instructions when executed cause the system to reposition a location of the non-occluding graphic as displayed on the electronic display to correspond to the second position wherein the non-occluding graphic was previously displayed on the electronic display to correspond to the first position.

20. The system of claim 11, wherein the initial graphic is an outline that surrounds the interested object.

* * * * *